US010578499B2

(12) United States Patent
Picciotto et al.

(10) Patent No.: US 10,578,499 B2
(45) Date of Patent: Mar. 3, 2020

(54) PIEZO-ACTUATED VIRTUAL BUTTONS FOR TOUCH SURFACES

(71) Applicant: Microsoft Technology Licensing, LLC, Redmond, WA (US)

(72) Inventors: Carl Picciotto, Clyde Hill, WA (US); Scott Mail, Seattle, WA (US); Dan Johnson, Milliken, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 809 days.

(21) Appl. No.: 13/769,356

(22) Filed: Feb. 17, 2013

(65) Prior Publication Data

US 2014/0230575 A1    Aug. 21, 2014

(51) Int. Cl.
*G01L 1/00* (2006.01)
*G06F 3/01* (2006.01)
(Continued)

(52) U.S. Cl.
CPC .............. *G01L 1/00* (2013.01); *G06F 3/016* (2013.01); *G06F 3/03547* (2013.01);
(Continued)

(58) Field of Classification Search
CPC ...... G06F 3/016; G06F 3/0414; G06F 3/0487; G06F 3/0488; G06F 3/03547
(Continued)

(56) References Cited

U.S. PATENT DOCUMENTS

| 578,325 A | 3/1897 | Fleming |
| 4,046,975 A | 9/1977 | Seeger, Jr. |

(Continued)

FOREIGN PATENT DOCUMENTS

| CN | 1722073 | 1/2006 |
| CN | 101118469 A | 2/2008 |

(Continued)

OTHER PUBLICATIONS

IDG TECHtalk. "Asahi Glass demos Dragontrail, a tough glass for consumer electronics". Jan. 20, 2011. Accessed [Online] <https://www.youtube.com/watch?v=WpbOoQpwAFs>. (Year: 2011).*

(Continued)

*Primary Examiner* — Jonathan M Dunlap
(74) *Attorney, Agent, or Firm* — NovoTechIP International PLLC

(57) ABSTRACT

Systems and methods of creating a touch sensitive surface structure comprising a piezo structure in communication with a deformable surface such that the piezo structure, or any suitable pressure sensing device, is capable of sensing pressure from a touch upon the deformable surface and communicating that pressure signal to an actuating circuit. The actuating circuit, upon receiving a suitable pressure signal, sends a piezo actuating signal to the piezo structure. The piezo structure, upon receiving the piezo actuating signal, is capable of communicating a mechanical signal to the deformable surface, sufficient for a person's finger to feel a "click" and/or haptic sensation. In one embodiment, the piezo actuating signal comprises a first slow charging portion and a second fast discharging portion, sufficient for the piezo structure to communicate the click and/or haptic sensation.

20 Claims, 6 Drawing Sheets

(51) Int. Cl.
  *G06F 3/0488* (2013.01)
  *G06F 3/041* (2006.01)
  *G06F 3/0354* (2013.01)
  *G06F 3/0487* (2013.01)

(52) U.S. Cl.
  CPC .......... *G06F 3/0414* (2013.01); *G06F 3/0487* (2013.01); *G06F 3/0488* (2013.01)

(58) Field of Classification Search
  USPC ........................................ 345/173–174, 156
  See application file for complete search history.

(56) References Cited

U.S. PATENT DOCUMENTS

| | | | |
|---|---|---|---|
| 4,065,649 A | 12/1977 | Carter et al. |
| 4,243,861 A | 1/1981 | Strandwitz |
| 4,279,021 A | 7/1981 | See et al. |
| 4,302,648 A | 11/1981 | Sado et al. |
| 4,317,013 A | 2/1982 | Larson |
| 4,326,193 A | 4/1982 | Markley et al. |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,890,832 A | 1/1990 | Komaki |
| 5,149,923 A | 9/1992 | Demeo |
| 5,220,521 A | 6/1993 | Kikinis |
| 5,283,559 A | 2/1994 | Kalendra et al. |
| 5,331,443 A | 7/1994 | Stanisci |
| 5,480,118 A | 1/1996 | Cross |
| 5,489,900 A | 2/1996 | Cali et al. |
| 5,510,783 A | 4/1996 | Findlater et al. |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,612,719 A | 3/1997 | Beernink et al. |
| 5,617,343 A | 4/1997 | Danielson et al. |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,859,642 A | 1/1999 | Jones |
| 5,862,381 A | 1/1999 | Advani et al. |
| 5,874,697 A | 2/1999 | Selker et al. |
| 5,909,211 A | 6/1999 | Combs et al. |
| 5,926,170 A | 7/1999 | Oba |
| 5,942,733 A | 8/1999 | Allen et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,147,859 A | 11/2000 | Abboud |
| 6,177,926 B1 | 1/2001 | Kunert |
| 6,178,443 B1 | 1/2001 | Lin |
| 6,239,786 B1 | 5/2001 | Burry et al. |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,429,846 B2 | 8/2002 | Rosenberg et al. |
| 6,437,682 B1 | 8/2002 | Vance |
| 6,477,561 B1 | 11/2002 | Robsman |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,758,615 B2 | 7/2004 | Monney et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,822,635 B2 | 11/2004 | Shahoian et al. |
| 6,856,506 B2 | 2/2005 | Doherty et al. |
| 6,861,961 B2 | 3/2005 | Sandbach et al. |
| 6,864,573 B2 | 3/2005 | Robertson et al. |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,977,352 B2 | 12/2005 | Oosawa |
| 7,051,149 B2 | 5/2006 | Wang et al. |
| 7,083,295 B1 | 8/2006 | Hanna |
| 7,091,436 B2 | 8/2006 | Serban |
| 7,091,955 B2 | 8/2006 | Kramer |
| 7,095,404 B2 | 8/2006 | Vincent et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,194,662 B2 | 3/2007 | Do et al. |
| 7,202,837 B2 | 4/2007 | Ihara |
| 7,213,991 B2 | 5/2007 | Chapman et al. |
| 7,224,830 B2 | 5/2007 | Nefian et al. |
| 7,245,292 B1 | 7/2007 | Custy |
| 7,277,087 B2 | 10/2007 | Hill et al. |
| 7,280,348 B2 | 10/2007 | Ghosh |
| 7,301,759 B2 | 11/2007 | Hsiung |
| 7,374,312 B2 | 5/2008 | Feng et al. |
| 7,401,992 B1 | 7/2008 | Lin |
| 7,423,557 B2 | 9/2008 | Kang |
| 7,446,276 B2 | 11/2008 | Plesko |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,557,312 B2 | 7/2009 | Clark et al. |
| 7,558,594 B2 | 7/2009 | Wilson |
| 7,559,834 B1 | 7/2009 | York |
| RE40,891 E | 9/2009 | Yasutake |
| 7,602,384 B2 | 10/2009 | Rosenberg et al. |
| 7,616,192 B2 | 11/2009 | Schroeder |
| 7,620,244 B1 | 11/2009 | Collier |
| 7,622,907 B2 | 11/2009 | Vranish |
| 7,636,921 B2 | 12/2009 | Louie |
| 7,639,876 B2 | 12/2009 | Clary et al. |
| 7,656,392 B2 | 2/2010 | Bolender |
| 7,686,694 B2 | 3/2010 | Cole |
| 7,728,820 B2 * | 6/2010 | Rosenberg .............. A63F 13/06 |
| | | | 178/18.01 |
| 7,728,923 B2 | 6/2010 | Kim et al. |
| 7,731,147 B2 | 6/2010 | Rha |

(56) References Cited

U.S. PATENT DOCUMENTS

| | | | |
|---|---|---|---|
| 7,733,326 B1 | 6/2010 | Adiseshan | |
| 7,736,042 B2 | 6/2010 | Park et al. | |
| 7,773,076 B2 | 8/2010 | Pittel et al. | |
| 7,773,121 B1 | 8/2010 | Huntsberger et al. | |
| 7,774,155 B2 | 8/2010 | Sato et al. | |
| 7,777,972 B1 | 8/2010 | Chen et al. | |
| 7,782,342 B2 | 8/2010 | Koh | |
| 7,813,715 B2 | 10/2010 | McKillop et al. | |
| 7,815,358 B2 | 10/2010 | Inditsky | |
| 7,817,428 B2 | 10/2010 | Greer, Jr. et al. | |
| 7,865,639 B2 | 1/2011 | McCoy et al. | |
| 7,880,727 B2 | 2/2011 | Abanami et al. | |
| 7,884,807 B2 | 2/2011 | Hovden et al. | |
| 7,890,863 B2* | 2/2011 | Grant | G06F 1/3231 715/701 |
| 7,907,394 B2 | 3/2011 | Richardson et al. | |
| D636,397 S | 4/2011 | Green | |
| 7,928,964 B2 | 4/2011 | Kolmykov-Zotov et al. | |
| 7,936,501 B2 | 5/2011 | Smith et al. | |
| 7,945,717 B2 | 5/2011 | Rivalsi | |
| 7,952,566 B2 | 5/2011 | Poupyrev et al. | |
| 7,970,246 B2 | 6/2011 | Travis et al. | |
| 7,973,771 B2 | 7/2011 | Geaghan | |
| 7,976,393 B2 | 7/2011 | Haga et al. | |
| 7,978,281 B2 | 7/2011 | Vergith et al. | |
| 8,016,255 B2 | 9/2011 | Lin | |
| 8,018,386 B2 | 9/2011 | Qi et al. | |
| 8,018,579 B1 | 9/2011 | Krah | |
| 8,022,939 B2 | 9/2011 | Hinata | |
| 8,026,904 B2 | 9/2011 | Westerman | |
| 8,053,688 B2 | 11/2011 | Conzola et al. | |
| 8,063,886 B2 | 11/2011 | Serban et al. | |
| 8,065,624 B2 | 11/2011 | Morin et al. | |
| 8,069,356 B2 | 11/2011 | Rathi et al. | |
| 8,077,160 B2 | 12/2011 | Land et al. | |
| 8,090,885 B2 | 1/2012 | Callaghan et al. | |
| 8,094,134 B2 | 1/2012 | Suzuki et al. | |
| 8,098,233 B2 | 1/2012 | Hotelling et al. | |
| 8,115,499 B2 | 2/2012 | Osoinach et al. | |
| 8,117,362 B2 | 2/2012 | Rodriguez et al. | |
| 8,118,274 B2 | 2/2012 | McClure et al. | |
| 8,118,681 B2 | 2/2012 | Mattice et al. | |
| 8,130,203 B2 | 3/2012 | Westerman | |
| 8,154,524 B2 | 4/2012 | Wilson et al. | |
| 8,162,282 B2 | 4/2012 | Hu et al. | |
| D659,139 S | 5/2012 | Gengler | |
| 8,169,421 B2 | 5/2012 | Wright et al. | |
| 8,189,973 B2 | 5/2012 | Travis et al. | |
| 8,216,074 B2 | 7/2012 | Sakuma | |
| 8,229,509 B2 | 7/2012 | Paek et al. | |
| 8,229,522 B2 | 7/2012 | Kim et al. | |
| 8,232,963 B2 | 7/2012 | Orsley et al. | |
| 8,267,368 B2 | 9/2012 | Torii et al. | |
| 8,269,093 B2 | 9/2012 | Naik et al. | |
| 8,274,784 B2 | 9/2012 | Franz et al. | |
| 8,279,589 B2 | 10/2012 | Kim | |
| 8,279,623 B2* | 10/2012 | Idzik | B06B 1/00 310/348 |
| 8,322,290 B1 | 12/2012 | Mignano | |
| 8,325,144 B1 | 12/2012 | Tierling et al. | |
| 8,330,061 B2 | 12/2012 | Rothkopf et al. | |
| 8,330,742 B2 | 12/2012 | Reynolds et al. | |
| 8,378,972 B2 | 2/2013 | Pance et al. | |
| 8,395,587 B2* | 3/2013 | Cauwels | G06F 3/016 310/339 |
| 8,403,576 B2 | 3/2013 | Merz | |
| 8,416,559 B2 | 4/2013 | Agata et al. | |
| 8,421,757 B2* | 4/2013 | Suzuki | G06F 3/0418 178/18.06 |
| 8,441,465 B2 | 5/2013 | Radivojevic et al. | |
| 8,487,751 B2 | 7/2013 | Laitinen et al. | |
| 8,498,100 B1 | 7/2013 | Whitt, III et al. | |
| D696,253 S | 12/2013 | Akana et al. | |
| 8,599,152 B1 | 12/2013 | Wurtenberger et al. | |
| 8,607,651 B2 | 12/2013 | Eventoff | |
| 8,633,916 B2* | 1/2014 | Bernstein et al. | 345/174 |
| 8,638,315 B2 | 1/2014 | Algreatly | |
| 8,659,555 B2 | 2/2014 | Pihlaja | |
| 8,661,363 B2 | 2/2014 | Platzer et al. | |
| 8,674,961 B2 | 3/2014 | Posamentier | |
| D704,702 S | 5/2014 | Akana et al. | |
| 8,757,374 B1 | 6/2014 | Kaiser | |
| 8,766,925 B2 | 7/2014 | Perlin et al. | |
| 8,831,677 B2 | 9/2014 | Villa-Real | |
| 8,836,664 B2 | 9/2014 | Colgate et al. | |
| 8,847,895 B2 | 9/2014 | Lim et al. | |
| 8,847,897 B2 | 9/2014 | Sakai et al. | |
| 8,854,331 B2 | 10/2014 | Heubel et al. | |
| 8,907,871 B2* | 12/2014 | Orsley | G06F 3/044 345/173 |
| 8,928,581 B2 | 1/2015 | Braun et al. | |
| 8,970,525 B1 | 3/2015 | de los Reyes | |
| 9,007,348 B2* | 4/2015 | Nikolovski | G06F 3/0436 345/173 |
| 9,047,012 B1 | 6/2015 | Bringert et al. | |
| 9,063,693 B2 | 6/2015 | Raken et al. | |
| 9,073,123 B2 | 7/2015 | Campbell et al. | |
| 9,098,304 B2 | 8/2015 | Young et al. | |
| 9,176,538 B2 | 11/2015 | Boulanger | |
| 9,287,916 B2* | 3/2016 | Wicks | H04B 1/3888 |
| 9,348,605 B2 | 5/2016 | Drasnin | |
| 9,360,893 B2 | 6/2016 | Bathiche et al. | |
| 9,411,436 B2 | 8/2016 | Shaw et al. | |
| 9,448,631 B2 | 9/2016 | Winter et al. | |
| 9,459,160 B2 | 10/2016 | Shaw et al. | |
| 10,061,385 B2 | 8/2018 | Churikov et al. | |
| 10,359,848 B2 | 7/2019 | Winter et al. | |
| 2001/0035697 A1 | 11/2001 | Rueger et al. | |
| 2001/0035859 A1 | 11/2001 | Kiser | |
| 2002/0000977 A1 | 1/2002 | Vranish | |
| 2002/0126445 A1 | 9/2002 | Minaguchi et al. | |
| 2002/0134828 A1 | 9/2002 | Sandbach et al. | |
| 2002/0154099 A1 | 10/2002 | Oh | |
| 2002/0174389 A1 | 11/2002 | Sato et al. | |
| 2002/0188721 A1 | 12/2002 | Lemel et al. | |
| 2003/0016282 A1 | 1/2003 | Koizumi | |
| 2003/0044215 A1 | 3/2003 | Monney et al. | |
| 2003/0083131 A1 | 5/2003 | Armstrong | |
| 2003/0107557 A1 | 6/2003 | Liebenow | |
| 2003/0132916 A1 | 7/2003 | Kramer | |
| 2003/0163611 A1 | 8/2003 | Nagao | |
| 2003/0197687 A1 | 10/2003 | Shetter | |
| 2003/0201982 A1 | 10/2003 | Iesaka | |
| 2004/0005184 A1 | 1/2004 | Kim et al. | |
| 2004/0100457 A1 | 5/2004 | Mandle | |
| 2004/0174670 A1 | 9/2004 | Huang et al. | |
| 2004/0190239 A1 | 9/2004 | Weng et al. | |
| 2004/0194075 A1 | 9/2004 | Molchanov et al. | |
| 2004/0212598 A1 | 10/2004 | Kraus et al. | |
| 2004/0227721 A1* | 11/2004 | Moilanen | G06F 1/1626 345/107 |
| 2004/0258924 A1 | 12/2004 | Berger et al. | |
| 2004/0267323 A1 | 12/2004 | Dupelle | |
| 2004/0268000 A1 | 12/2004 | Barker et al. | |
| 2005/0030728 A1 | 2/2005 | Kawashima et al. | |
| 2005/0057515 A1 | 3/2005 | Bathiche | |
| 2005/0057521 A1 | 3/2005 | Aull et al. | |
| 2005/0059441 A1 | 3/2005 | Miyashita | |
| 2005/0059489 A1 | 3/2005 | Kim | |
| 2005/0146512 A1 | 7/2005 | Hill et al. | |
| 2005/0190159 A1 | 9/2005 | Skarine | |
| 2005/0240949 A1 | 10/2005 | Liu et al. | |
| 2005/0264653 A1 | 12/2005 | Starkweather et al. | |
| 2005/0264988 A1 | 12/2005 | Nicolosi | |
| 2005/0285703 A1 | 12/2005 | Wheeler et al. | |
| 2006/0028095 A1 | 2/2006 | Maruyama et al. | |
| 2006/0049993 A1 | 3/2006 | Lin et al. | |
| 2006/0063073 A1 | 3/2006 | Kawashima et al. | |
| 2006/0082973 A1 | 4/2006 | Egbert et al. | |
| 2006/0085658 A1 | 4/2006 | Allen et al. | |
| 2006/0102914 A1 | 5/2006 | Smits et al. | |
| 2006/0103633 A1 | 5/2006 | Gioeli | |
| 2006/0125799 A1 | 6/2006 | Hillis et al. | |
| 2006/0132423 A1 | 6/2006 | Travis | |

(56) References Cited

U.S. PATENT DOCUMENTS

| | | |
|---|---|---|
| 2006/0154725 A1 | 7/2006 | Glaser et al. |
| 2006/0156415 A1 | 7/2006 | Rubinstein et al. |
| 2006/0158433 A1 | 7/2006 | Serban et al. |
| 2006/0181514 A1 | 8/2006 | Newman |
| 2006/0181521 A1 | 8/2006 | Perreault et al. |
| 2006/0187216 A1 | 8/2006 | Trent, Jr. et al. |
| 2006/0195522 A1 | 8/2006 | Miyazaki |
| 2006/0197753 A1 | 9/2006 | Hotelling |
| 2006/0197754 A1 | 9/2006 | Keely |
| 2006/0197755 A1 | 9/2006 | Bawany |
| 2006/0209037 A1 | 9/2006 | Wang et al. |
| 2006/0209050 A1 | 9/2006 | Serban |
| 2006/0238510 A1 | 10/2006 | Panotopoulos et al. |
| 2006/0248597 A1 | 11/2006 | Keneman |
| 2007/0018601 A1 | 1/2007 | Steinbach et al. |
| 2007/0043725 A1 | 2/2007 | Hotelling et al. |
| 2007/0047221 A1 | 3/2007 | Park |
| 2007/0051792 A1 | 3/2007 | Wheeler et al. |
| 2007/0056385 A1 | 3/2007 | Lorenz |
| 2007/0057922 A1 | 3/2007 | Schultz et al. |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0152983 A1 | 7/2007 | McKillop et al. |
| 2007/0182663 A1 | 8/2007 | Biech |
| 2007/0182722 A1 | 8/2007 | Hotelling et al. |
| 2007/0200830 A1 | 8/2007 | Yamamoto |
| 2007/0205995 A1 | 9/2007 | Woolley |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236472 A1 | 10/2007 | Bentsen |
| 2007/0236475 A1 | 10/2007 | Wherry |
| 2007/0247338 A1 | 10/2007 | Marchetto |
| 2007/0247432 A1 | 10/2007 | Oakley |
| 2007/0257821 A1 | 11/2007 | Son et al. |
| 2007/0260892 A1 | 11/2007 | Paul et al. |
| 2007/0274094 A1 | 11/2007 | Schultz et al. |
| 2007/0274095 A1 | 11/2007 | Destain |
| 2007/0283179 A1 | 12/2007 | Burnett et al. |
| 2008/0005423 A1 | 1/2008 | Jacobs et al. |
| 2008/0012835 A1 | 1/2008 | Rimon et al. |
| 2008/0013809 A1 | 1/2008 | Zhu et al. |
| 2008/0018608 A1 | 1/2008 | Serban et al. |
| 2008/0018611 A1 | 1/2008 | Serban et al. |
| 2008/0024459 A1 | 1/2008 | Poupyrev et al. |
| 2008/0042994 A1 | 2/2008 | Gillespie et al. |
| 2008/0094367 A1 | 4/2008 | Van De Ven et al. |
| 2008/0104437 A1 | 5/2008 | Lee |
| 2008/0151478 A1 | 6/2008 | Chern |
| 2008/0158185 A1 | 7/2008 | Westerman |
| 2008/0167832 A1 | 7/2008 | Soss |
| 2008/0180411 A1 | 7/2008 | Solomon et al. |
| 2008/0196945 A1 | 8/2008 | Konstas |
| 2008/0202251 A1 | 8/2008 | Serban et al. |
| 2008/0202824 A1 | 8/2008 | Philipp et al. |
| 2008/0219025 A1 | 9/2008 | Spitzer et al. |
| 2008/0224659 A1 | 9/2008 | Singh |
| 2008/0228969 A1 | 9/2008 | Cheah et al. |
| 2008/0232061 A1 | 9/2008 | Wang et al. |
| 2008/0238884 A1 | 10/2008 | Harish |
| 2008/0253822 A1 | 10/2008 | Matias |
| 2008/0297878 A1 | 12/2008 | Brown et al. |
| 2008/0303646 A1 | 12/2008 | Elwell et al. |
| 2008/0309636 A1 | 12/2008 | Feng et al. |
| 2008/0316002 A1 | 12/2008 | Brunet et al. |
| 2008/0316066 A1* | 12/2008 | Minato .......... H03M 11/20 341/24 |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0085878 A1 | 4/2009 | Heubel et al. |
| 2009/0090568 A1 | 4/2009 | Min |
| 2009/0101417 A1* | 4/2009 | Suzuki .......... G06F 3/0418 178/18.06 |
| 2009/0106655 A1 | 4/2009 | Grant et al. |
| 2009/0117955 A1 | 5/2009 | Lo |
| 2009/0127005 A1 | 5/2009 | Zachut et al. |
| 2009/0128374 A1 | 5/2009 | Kurth |
| 2009/0135142 A1 | 5/2009 | Fu et al. |
| 2009/0140985 A1 | 6/2009 | Liu |
| 2009/0160529 A1 | 6/2009 | Lamborghini |
| 2009/0163147 A1 | 6/2009 | Steigerwald et al. |
| 2009/0167704 A1 | 7/2009 | Terlizzi et al. |
| 2009/0174679 A1* | 7/2009 | Westerman ......... G06F 3/03547 345/173 |
| 2009/0182901 A1 | 7/2009 | Callaghan et al. |
| 2009/0195497 A1 | 8/2009 | Fitzgerald et al. |
| 2009/0200148 A1 | 8/2009 | Honmatsu et al. |
| 2009/0219250 A1 | 9/2009 | Ure |
| 2009/0231019 A1 | 9/2009 | Yeh |
| 2009/0231275 A1 | 9/2009 | Odgers |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0267892 A1 | 10/2009 | Faubert |
| 2009/0284397 A1 | 11/2009 | Lee et al. |
| 2009/0295739 A1 | 12/2009 | Nagara |
| 2009/0303137 A1 | 12/2009 | Kusaka et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0013613 A1 | 1/2010 | Weston |
| 2010/0026656 A1 | 2/2010 | Hotelling et al. |
| 2010/0038821 A1 | 2/2010 | Jenkins et al. |
| 2010/0039764 A1 | 2/2010 | Locker et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053087 A1 | 3/2010 | Dai et al. |
| 2010/0053534 A1 | 3/2010 | Hsieh et al. |
| 2010/0075517 A1 | 3/2010 | Ni et al. |
| 2010/0077237 A1 | 3/2010 | Sawyers |
| 2010/0079398 A1 | 4/2010 | Shen et al. |
| 2010/0081377 A1 | 4/2010 | Chatterjee et al. |
| 2010/0085321 A1 | 4/2010 | Pundsack |
| 2010/0097198 A1* | 4/2010 | Suzuki .......... G06F 3/0416 340/407.2 |
| 2010/0102182 A1 | 4/2010 | Lin |
| 2010/0103112 A1 | 4/2010 | Yoo et al. |
| 2010/0103131 A1 | 4/2010 | Segal et al. |
| 2010/0103611 A1 | 4/2010 | Yang et al. |
| 2010/0123686 A1 | 5/2010 | Klinghult et al. |
| 2010/0133398 A1 | 6/2010 | Chiu et al. |
| 2010/0137033 A1 | 6/2010 | Lee |
| 2010/0141588 A1 | 6/2010 | Kimura et al. |
| 2010/0142130 A1 | 6/2010 | Wang et al. |
| 2010/0148642 A1 | 6/2010 | Eromaki et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0162109 A1 | 6/2010 | Chatterjee et al. |
| 2010/0162179 A1 | 6/2010 | Porat |
| 2010/0164857 A1 | 7/2010 | Liu et al. |
| 2010/0171708 A1 | 7/2010 | Chuang |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0182263 A1 | 7/2010 | Aunio et al. |
| 2010/0188299 A1 | 7/2010 | Rinehart et al. |

(56) References Cited

U.S. PATENT DOCUMENTS

| | | |
|---|---|---|
| 2010/0188338 A1 | 7/2010 | Longe |
| 2010/0206614 A1 | 8/2010 | Park et al. |
| 2010/0206644 A1 | 8/2010 | Yeh |
| 2010/0214239 A1 | 8/2010 | Wu |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0238075 A1 | 9/2010 | Pourseyed |
| 2010/0238119 A1 | 9/2010 | Dubrovsky et al. |
| 2010/0238138 A1 | 9/2010 | Goertz et al. |
| 2010/0244577 A1 | 9/2010 | Shimokawa |
| 2010/0245221 A1 | 9/2010 | Khan |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0289508 A1 | 11/2010 | Joguet et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315267 A1* | 12/2010 | Chung ............... B60R 25/24 341/22 |
| 2010/0315348 A1 | 12/2010 | Jellicoe et al. |
| 2010/0315373 A1 | 12/2010 | Steinhauser et al. |
| 2010/0321299 A1 | 12/2010 | Shelley et al. |
| 2010/0321301 A1 | 12/2010 | Casparian et al. |
| 2010/0321330 A1 | 12/2010 | Lim et al. |
| 2010/0321339 A1 | 12/2010 | Kimmel |
| 2010/0325155 A1 | 12/2010 | Skinner et al. |
| 2010/0328230 A1 | 12/2010 | Faubert et al. |
| 2010/0331059 A1 | 12/2010 | Apgar et al. |
| 2011/0007008 A1 | 1/2011 | Algreatly |
| 2011/0012873 A1 | 1/2011 | Prest et al. |
| 2011/0018556 A1 | 1/2011 | Le et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037379 A1 | 2/2011 | Lecamp et al. |
| 2011/0037705 A1 | 2/2011 | Yilmaz |
| 2011/0037721 A1 | 2/2011 | Cranfill et al. |
| 2011/0043454 A1 | 2/2011 | Modarres et al. |
| 2011/0043990 A1 | 2/2011 | Mickey et al. |
| 2011/0049094 A1 | 3/2011 | Wu |
| 2011/0050037 A1 | 3/2011 | Rinner et al. |
| 2011/0050587 A1 | 3/2011 | Natanzon et al. |
| 2011/0050630 A1 | 3/2011 | Ikeda |
| 2011/0055407 A1 | 3/2011 | Lydon et al. |
| 2011/0057899 A1 | 3/2011 | Sleeman et al. |
| 2011/0059771 A1 | 3/2011 | Kondo |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0074702 A1* | 3/2011 | Pertuit ................ G06F 3/016 345/173 |
| 2011/0080347 A1* | 4/2011 | Steeves ............. G06F 1/1626 345/173 |
| 2011/0080367 A1* | 4/2011 | Marchand ......... G06F 1/3215 345/174 |
| 2011/0084909 A1 | 4/2011 | Hsieh et al. |
| 2011/0095994 A1 | 4/2011 | Birnbaum |
| 2011/0096513 A1 | 4/2011 | Kim |
| 2011/0102326 A1* | 5/2011 | Casparian ........... G06F 3/016 345/168 |
| 2011/0102356 A1 | 5/2011 | Kemppinen et al. |
| 2011/0115712 A1 | 5/2011 | Han et al. |
| 2011/0115747 A1 | 5/2011 | Powell et al. |
| 2011/0118025 A1 | 5/2011 | Lukas et al. |
| 2011/0128227 A1* | 6/2011 | Theimer .............. G06F 3/016 345/167 |
| 2011/0134032 A1 | 6/2011 | Chiu et al. |
| 2011/0134112 A1 | 6/2011 | Koh et al. |
| 2011/0141052 A1 | 6/2011 | Bernstein |
| 2011/0147398 A1 | 6/2011 | Ahee et al. |
| 2011/0148793 A1 | 6/2011 | Ciesla et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205161 A1* | 8/2011 | Myers ................. G06F 3/016 345/169 |
| 2011/0205163 A1 | 8/2011 | Hinckley et al. |
| 2011/0205372 A1 | 8/2011 | Miramontes |
| 2011/0209093 A1 | 8/2011 | Hinckley |
| 2011/0209097 A1 | 8/2011 | Hinckley |
| 2011/0209098 A1 | 8/2011 | Hinckley et al. |
| 2011/0209099 A1 | 8/2011 | Hinckley |
| 2011/0216266 A1 | 9/2011 | Travis |
| 2011/0222238 A1 | 9/2011 | Staats et al. |
| 2011/0227872 A1* | 9/2011 | Huska ................. G06F 3/016 345/174 |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0241999 A1 | 10/2011 | Thier |
| 2011/0242138 A1 | 10/2011 | Tribble |
| 2011/0248152 A1 | 10/2011 | Svajda et al. |
| 2011/0248920 A1 | 10/2011 | Larsen |
| 2011/0248930 A1* | 10/2011 | Kwok ................. G06F 3/016 345/173 |
| 2011/0248941 A1 | 10/2011 | Abdo et al. |
| 2011/0261001 A1 | 10/2011 | Liu |
| 2011/0261021 A1 | 10/2011 | Modarres et al. |
| 2011/0261083 A1 | 10/2011 | Wilson |
| 2011/0267294 A1* | 11/2011 | Kildal ............................ 345/173 |
| 2011/0267300 A1 | 11/2011 | Serban et al. |
| 2011/0267757 A1 | 11/2011 | Probst et al. |
| 2011/0290686 A1 | 12/2011 | Huang |
| 2011/0291922 A1* | 12/2011 | Stewart ............. G06F 3/03547 345/156 |
| 2011/0291951 A1 | 12/2011 | Tong |
| 2011/0295697 A1 | 12/2011 | Boston et al. |
| 2011/0297566 A1 | 12/2011 | Gallagher et al. |
| 2011/0304577 A1 | 12/2011 | Brown et al. |
| 2011/0304962 A1 | 12/2011 | Su |
| 2011/0306424 A1 | 12/2011 | Kazama et al. |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0013519 A1 | 1/2012 | Hakansson et al. |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0055770 A1 | 3/2012 | Chen |
| 2012/0062245 A1 | 3/2012 | Bao et al. |
| 2012/0068933 A1 | 3/2012 | Larsen |
| 2012/0068957 A1* | 3/2012 | Puskarich et al. ............ 345/174 |
| 2012/0072167 A1 | 3/2012 | Cretella, Jr. et al. |
| 2012/0075198 A1* | 3/2012 | Sulem ................. G06F 3/016 345/173 |
| 2012/0075221 A1 | 3/2012 | Yasuda |
| 2012/0075249 A1 | 3/2012 | Hoch |
| 2012/0081316 A1 | 4/2012 | Sirpal et al. |
| 2012/0087078 A1 | 4/2012 | Medica et al. |
| 2012/0092279 A1 | 4/2012 | Martin |
| 2012/0092350 A1 | 4/2012 | Ganapathi et al. |
| 2012/0094257 A1 | 4/2012 | Pillischer et al. |
| 2012/0098751 A1 | 4/2012 | Lin |

(56) References Cited

U.S. PATENT DOCUMENTS

| | | |
|---|---|---|
| 2012/0099263 A1 | 4/2012 | Lin |
| 2012/0099749 A1 | 4/2012 | Rubin et al. |
| 2012/0105481 A1* | 5/2012 | Baek .................. G06F 3/04886 345/652 |
| 2012/0106078 A1 | 5/2012 | Probst et al. |
| 2012/0106082 A1 | 5/2012 | Wu et al. |
| 2012/0113579 A1 | 5/2012 | Agata et al. |
| 2012/0115553 A1 | 5/2012 | Mahe et al. |
| 2012/0117409 A1 | 5/2012 | Lee et al. |
| 2012/0127071 A1 | 5/2012 | Jitkoff et al. |
| 2012/0127118 A1 | 5/2012 | Nolting et al. |
| 2012/0127646 A1 | 5/2012 | Moscovitch |
| 2012/0139844 A1 | 6/2012 | Ramstein et al. |
| 2012/0140396 A1 | 6/2012 | Zeliff et al. |
| 2012/0145525 A1 | 6/2012 | Ishikawa |
| 2012/0155015 A1 | 6/2012 | Govindasamy et al. |
| 2012/0162693 A1 | 6/2012 | Ito |
| 2012/0175487 A1 | 7/2012 | Goto |
| 2012/0182242 A1 | 7/2012 | Lindahl et al. |
| 2012/0188180 A1 | 7/2012 | Yang et al. |
| 2012/0194393 A1 | 8/2012 | Utterman et al. |
| 2012/0194448 A1 | 8/2012 | Rothkopf |
| 2012/0200517 A1* | 8/2012 | Nikolovski ............ G06F 3/0436 345/173 |
| 2012/0200532 A1 | 8/2012 | Powell et al. |
| 2012/0200802 A1 | 8/2012 | Large |
| 2012/0206401 A1 | 8/2012 | Lin et al. |
| 2012/0206937 A1 | 8/2012 | Travis et al. |
| 2012/0223866 A1 | 9/2012 | Ayala Vazquez et al. |
| 2012/0224073 A1 | 9/2012 | Miyahara |
| 2012/0229401 A1 | 9/2012 | Birnbaum et al. |
| 2012/0235635 A1 | 9/2012 | Sato |
| 2012/0235921 A1 | 9/2012 | Laubach |
| 2012/0235942 A1* | 9/2012 | Shahoian ............... G06F 1/1616 345/173 |
| 2012/0242588 A1* | 9/2012 | Myers et al. .................. 345/173 |
| 2012/0246377 A1 | 9/2012 | Bhesania |
| 2012/0249459 A1* | 10/2012 | Sashida et al. ................ 345/173 |
| 2012/0249474 A1* | 10/2012 | Pratt .................... G06F 1/1694 345/174 |
| 2012/0256848 A1* | 10/2012 | Madabusi Srinivasan ................... G06F 1/1626 345/173 |
| 2012/0256959 A1 | 10/2012 | Ye et al. |
| 2012/0268412 A1 | 10/2012 | Cruz-Hernandez et al. |
| 2012/0268911 A1 | 10/2012 | Lin |
| 2012/0274578 A1* | 11/2012 | Snow .................... G06F 3/0488 345/173 |
| 2012/0274811 A1 | 11/2012 | Bakin |
| 2012/0287562 A1 | 11/2012 | Wu et al. |
| 2012/0297339 A1 | 11/2012 | Ito |
| 2012/0299866 A1 | 11/2012 | Pao et al. |
| 2012/0300275 A1 | 11/2012 | Vilardell et al. |
| 2012/0304199 A1 | 11/2012 | Homma et al. |
| 2012/0312955 A1 | 12/2012 | Randolph |
| 2012/0327025 A1* | 12/2012 | Huska .................... G06F 3/016 345/174 |
| 2012/0328349 A1 | 12/2012 | Isaac et al. |
| 2013/0009892 A1* | 1/2013 | Salmela .......................... 345/173 |
| 2013/0016059 A1 | 1/2013 | Lowles et al. |
| 2013/0016060 A1 | 1/2013 | Pereverzev et al. |
| 2013/0044059 A1 | 2/2013 | Fu |
| 2013/0047747 A1 | 2/2013 | Joung |
| 2013/0063364 A1 | 3/2013 | Moore |
| 2013/0063389 A1 | 3/2013 | Moore |
| 2013/0063873 A1 | 3/2013 | Wodrich et al. |
| 2013/0076646 A1 | 3/2013 | Krah et al. |
| 2013/0076652 A1 | 3/2013 | Leung |
| 2013/0088431 A1 | 4/2013 | Ballagas et al. |
| 2013/0088442 A1 | 4/2013 | Lee |
| 2013/0094131 A1 | 4/2013 | O'Donnell et al. |
| 2013/0097534 A1 | 4/2013 | Lewin et al. |
| 2013/0100052 A1 | 4/2013 | Yilmaz |
| 2013/0106766 A1 | 5/2013 | Yilmaz et al. |
| 2013/0107144 A1 | 5/2013 | Marhefka et al. |
| 2013/0118933 A1 | 5/2013 | Wang et al. |
| 2013/0127735 A1* | 5/2013 | Motoyama .......... G06F 3/04886 345/173 |
| 2013/0141370 A1 | 6/2013 | Wang et al. |
| 2013/0167663 A1 | 7/2013 | Eventoff |
| 2013/0194235 A1 | 8/2013 | Zanone et al. |
| 2013/0201115 A1* | 8/2013 | Heubel ........................ 345/173 |
| 2013/0207917 A1 | 8/2013 | Cruz-Hernandez et al. |
| 2013/0222286 A1* | 8/2013 | Kang ...................... G06F 3/041 345/173 |
| 2013/0227836 A1 | 9/2013 | Whitt, III |
| 2013/0228433 A1 | 9/2013 | Shaw |
| 2013/0229273 A1 | 9/2013 | Nodar Cortizo et al. |
| 2013/0229356 A1 | 9/2013 | Marwah et al. |
| 2013/0229386 A1 | 9/2013 | Bathiche |
| 2013/0249802 A1 | 9/2013 | Yasutake |
| 2013/0275058 A1 | 10/2013 | Awad |
| 2013/0278542 A1 | 10/2013 | Stephanou et al. |
| 2013/0278552 A1 | 10/2013 | Kamin-Lyndgaard |
| 2013/0300683 A1* | 11/2013 | Birnbaum ............... G06F 3/016 345/173 |
| 2013/0304941 A1 | 11/2013 | Drasnin |
| 2013/0304944 A1 | 11/2013 | Young |
| 2013/0311881 A1 | 11/2013 | Birnbaum et al. |
| 2013/0314341 A1 | 11/2013 | Lee et al. |
| 2013/0321291 A1* | 12/2013 | Sim ...................... G06F 3/0488 345/173 |
| 2013/0335209 A1 | 12/2013 | Cruz-Hernandez et al. |
| 2013/0335330 A1 | 12/2013 | Lane |
| 2013/0335902 A1 | 12/2013 | Campbell |
| 2013/0335903 A1 | 12/2013 | Raken |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0008203 A1 | 1/2014 | Nathan et al. |
| 2014/0009429 A1* | 1/2014 | Verweg .................... G06F 3/044 345/174 |
| 2014/0020484 A1 | 1/2014 | Shaw et al. |
| 2014/0022177 A1 | 1/2014 | Shaw |
| 2014/0028624 A1 | 1/2014 | Marsden et al. |
| 2014/0055375 A1* | 2/2014 | Kim et al. ..................... 345/173 |
| 2014/0062933 A1 | 3/2014 | Coulson et al. |
| 2014/0062934 A1 | 3/2014 | Coulson et al. |
| 2014/0083207 A1 | 3/2014 | Eventoff |
| 2014/0085247 A1 | 3/2014 | Leung et al. |
| 2014/0092003 A1 | 4/2014 | Liu |
| 2014/0092055 A1 | 4/2014 | Radivojevic et al. |
| 2014/0098058 A1* | 4/2014 | Baharav ................ G06F 3/0421 345/174 |
| 2014/0104189 A1* | 4/2014 | Marshall ............... G06F 3/0488 345/173 |
| 2014/0139436 A1* | 5/2014 | Ramstein et al. ............. 345/168 |
| 2014/0139452 A1 | 5/2014 | Levesque et al. |
| 2014/0139472 A1 | 5/2014 | Takenaka |
| 2014/0197058 A1 | 7/2014 | Huet et al. |
| 2014/0198072 A1 | 7/2014 | Schuele et al. |
| 2014/0204059 A1 | 7/2014 | Geaghan |
| 2014/0210742 A1 | 7/2014 | Delattre et al. |
| 2014/0221098 A1 | 8/2014 | Boulanger |
| 2014/0225821 A1* | 8/2014 | Kim ........................ H04M 1/236 345/156 |
| 2014/0225857 A1 | 8/2014 | Ma |
| 2014/0230575 A1 | 8/2014 | Picciotto et al. |
| 2014/0232657 A1 | 8/2014 | Aviles et al. |
| 2014/0232679 A1 | 8/2014 | Whitman et al. |
| 2014/0253305 A1 | 9/2014 | Rosenberg et al. |
| 2014/0306914 A1 | 10/2014 | Kagayama |
| 2014/0320393 A1 | 10/2014 | Modarres et al. |
| 2014/0332417 A1* | 11/2014 | Wicks .................. H04B 1/3888 206/37 |
| 2014/0354587 A1 | 12/2014 | Mohindra et al. |
| 2014/0370937 A1* | 12/2014 | Park .................... H04M 1/72519 455/566 |
| 2015/0084865 A1 | 3/2015 | Shaw et al. |
| 2015/0084909 A1 | 3/2015 | Worfolk et al. |
| 2015/0097786 A1 | 4/2015 | Behles et al. |

(56) References Cited

U.S. PATENT DOCUMENTS

| | | | |
|---|---|---|---|
| 2015/0103427 A1* | 4/2015 | Beck | F24J 2/08 |
| | | | 359/853 |
| 2015/0116205 A1 | 4/2015 | Westerman et al. | |
| 2015/0160778 A1 | 6/2015 | Kim et al. | |
| 2015/0185842 A1 | 7/2015 | Picciotto et al. | |
| 2015/0185950 A1* | 7/2015 | Watanabe | G06F 3/0416 |
| | | | 345/173 |
| 2015/0193034 A1 | 7/2015 | Jeong et al. | |
| 2015/0227207 A1 | 8/2015 | Winter et al. | |
| 2015/0241929 A1 | 8/2015 | Raken et al. | |
| 2015/0242012 A1 | 8/2015 | Petcavich et al. | |
| 2015/0253872 A1* | 9/2015 | Reyes | G06F 3/044 |
| | | | 345/157 |
| 2015/0293592 A1 | 10/2015 | Cheong et al. | |
| 2015/0301642 A1 | 10/2015 | Hanauer et al. | |
| 2015/0331150 A1* | 11/2015 | Furholz | C23C 18/12 |
| | | | 428/212 |
| 2015/0370376 A1 | 12/2015 | Harley et al. | |
| 2016/0018894 A1 | 1/2016 | Yliaho et al. | |
| 2016/0063828 A1 | 3/2016 | Moussette et al. | |
| 2016/0070398 A1 | 3/2016 | Worfolk | |
| 2016/0085268 A1* | 3/2016 | Aurongzeb | G06F 1/1652 |
| | | | 345/156 |
| 2016/0135742 A1 | 5/2016 | Cobbett et al. | |
| 2016/0147310 A1 | 5/2016 | Pate | |
| 2016/0170935 A1 | 6/2016 | Drasnin | |
| 2016/0195955 A1 | 7/2016 | Picciotto et al. | |
| 2016/0357296 A1 | 12/2016 | Picciotto et al. | |
| 2017/0023418 A1 | 1/2017 | Shaw et al. | |
| 2017/0102770 A1 | 4/2017 | Winter et al. | |
| 2017/0212591 A1 | 7/2017 | Churikov et al. | |

FOREIGN PATENT DOCUMENTS

| | | |
|---|---|---|
| CN | 101334741 A | 12/2008 |
| CN | 101763166 | 6/2010 |
| CN | 101938396 A | 1/2011 |
| CN | 102043465 A | 5/2011 |
| CN | 102117121 A | 7/2011 |
| CN | 102236463 A | 11/2011 |
| CN | 102292687 A | 12/2011 |
| CN | 102356624 A | 2/2012 |
| CN | 102906673 A | 1/2013 |
| EP | 1223722 | 7/2002 |
| EP | 1591891 | 11/2005 |
| EP | 2353978 | 8/2011 |
| EP | 2381340 | 10/2011 |
| EP | 2584432 | 4/2013 |
| GB | 2178570 | 2/1987 |
| JP | 10326124 | 12/1998 |
| JP | 1173239 | 3/1999 |
| JP | 11345041 | 12/1999 |
| KR | 1020110087178 | 8/2011 |
| NL | 1038411 | 5/2012 |
| WO | WO-2010011983 | 1/2010 |
| WO | WO-2012036717 | 3/2012 |
| WO | WO-2012173305 | 12/2012 |
| WO | WO-2013169299 | 11/2013 |
| WO | WO-2014098946 | 6/2014 |

OTHER PUBLICATIONS

"International Search Report & Written Opinion for PCT Patent Application No. PCT/US2014/016151", dated May 16, 2014, Filed Date: Feb. 13, 2014, 10 Pages.

Apple's haptic touch feedback concept uses actuators, senses force on iPhone, iPad—Published Date: Mar. 22, 2012 Proceedings: NA Author: Neil Hughes pp. NA http://appleinsider.com/articles/12/03/22/.

Taxel: Initial Progress toward Self-Morphing Visio-Haptic Interface—Published Date: Jun. 21, 2011 Proceedings: In IEEE World Haptics Conference Author: Ki-Uk Kyung, Jeong Mook Lim, Yo-An Lim, Suntak Park, Seung Koo Park, Inwook Hwang, Seungmoon Choi, Jongman Seo, Sang-Youn Kim, Tae-Neon Yang, and Dong-Soo Kwon pp. 6.

Capacitive Touch Sensors—Published Date: Jan. 12, 2010 Proceedings: Fujitsu Microelectronics Europe GmbH Author: NA pp. 12 http://www.fujitsu.com/downloads/MICRO/fme/articles/fujitsu-whitepaper-capacitive-touch-sensors.pdf.

Haptic Feedback Chips Make Virtual-Button Applications on Handheld Devices a Snap—Published Date: Sep. 10, 2009 Proceedings: NA Author: Don Tuite pp. NA http://electronicdesign.com/article/analog-and-mixed-signal/haptic-feedback-chips-make-virtual-button-applicat.

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Advanced Configuration and Power Management Specification", Intel Corporation, Microsoft Corporation, Toshiba Corp. Revision 1, Dec. 22, 1996, 364 pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, dated Apr. 9, 2013, 2 pages.

"Corrected Notice of Allowance", U.S. Appl. No. 13/470,633, dated Jul. 2, 2013, 2 pages.

"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>, Aug. 30, 2010, pp. 1-10.

"Directional Backlighting for Display Panels", U.S. Appl. No. 13/021,448, filed Feb. 4, 2011, 38 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.

"Enhancing Your Device Design Through Tactile Feedback", Immersion, Available at <http://www.immersion.com/docs/Enhancing-Device-Design-Through-Tactile-Feedback.pdf>, Apr. 2011, pp. 1-7.

"Ex Parte Quayle Action", U.S. Appl. No. 13/599,763, filed Nov. 14, 2014, 6 pages.

"Final Office Action", U.S. Appl. No. 13/471,001, dated Jul. 25, 2013, 20 pages.

"Final Office Action", U.S. Appl. No. 13/527,263, dated Jan. 27, 2015, 7 pages.

"Final Office Action", U.S. Appl. No. 13/603,918, dated Mar. 21, 2014, 14 pages.

"Final Office Action", U.S. Appl. No. 13/647,479, dated Dec. 12, 2014, 12 pages.

"Final Office Action", U.S. Appl. No. 13/651,195, dated Apr. 18, 2013, 13 pages.

"Final Office Action", U.S. Appl. No. 13/651,232, dated May 21, 2013, 21 pages.

"Final Office Action", U.S. Appl. No. 13/651,287, dated May 3, 2013, 16 pages.

"Final Office Action", U.S. Appl. No. 13/651,976, dated Jul. 25, 2013, 21 pages.

"Final Office Action", U.S. Appl. No. 13/653,321, dated Aug. 2, 2013, 17 pages.

"Final Office Action", U.S. Appl. No. 13/655,065, dated Apr. 2, 2015, 23 pages.

"Final Office Action", U.S. Appl. No. 13/655,065, dated Aug. 8, 2014, 20 pages.

"Final Office Action", U.S. Appl. No. 13/782,137, dated May 8, 2015, 19 pages.

(56) References Cited

OTHER PUBLICATIONS

"Final Office Action", U.S. Appl. No. 13/974,749, dated May 21, 2015, 19 pages.
"Final Office Action", U.S. Appl. No. 13/974,749, dated Sep. 5, 2014, 18 pages.
"Final Office Action", U.S. Appl. No. 13/974,994, dated Jun. 10, 2015, 28 pages.
"Final Office Action", U.S. Appl. No. 13/974,994, dated Oct. 6, 2014, 26 pages.
"Final Office Action", U.S. Appl. No. 13/975,087, dated Aug. 7, 2015, 16 pages.
"Final Office Action", U.S. Appl. No. 13/975,087, dated Sep. 10, 2014, 19 pages.
"Final Office Action", U.S. Appl. No. 14/033,510, dated Jun. 5, 2015, 24 pages.
"Final Office Action", U.S. Appl. No. 14/033,510, dated Aug. 21, 2014, 18 pages.
"First One Handed Fabric Keyboard with Bluetooth Wireless Technology", Retrieved from: <http://press.xtvworld.com/article3817.html> on May 8, 2012, Jan. 6, 2005, 2 pages.
"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.
"iControlPad 2—The open source controller", Retrieved from <http://www.kickstarter.com/projects/1703567677/icontrolpad-2-the-open-source-controller> on Nov. 20, 2012, 2012, 15 pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Search Report and Written Opinion", Application No. PCT/US2014/068687, dated Mar. 18, 2015, 10 pages.
"International Search Report and Written Opinion", Application No. PCT/US2014/016743, dated Jul. 24, 2014, 10 pages.
"International Search Report and Written Opinion", Application No. PCT/US2014/056185, dated Dec. 4, 2014, 10 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/040968, dated Sep. 5, 2013, 11 pages.
"International Search Report and Written Opinion", Application No. PCT/US2013/044871, dated Aug. 14, 2013, 12 pages.
"International Search Report and Written Opinion", Application No. PCT/US2014/014522, dated Jun. 6, 2014, 13 pages.
"International Search Report and Written Opinion", Application No. PCT/US2013/045283, dated Mar. 12, 2014, 19 pages.
"International Search Report and Written Opinion", Application No. PCT/US2013/044873, dated Nov. 22, 2013, 9 pages.
"International Search Report and Written Opinion", Application No. PCT/US2013/045049, dated Sep. 16, 2013, 9 pages.
"Membrane Keyboards & Membrane Keypads", Retrieved from: <http://www.pannam.com/> on May 9, 2012, Mar. 4, 2009, 2 pages.
"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.
"Motion Sensors", Android Developers—retrieved from <http://developer.android.com/guide/topics/sensors/sensors_motion.html> on May 25, 2012, 2012, 7 pages.

"MPC Fly Music Production Controller", AKAI Professional, Retrieved from: <http://www.akaiprompc.com/mpc-fly> on Jul. 9, 2012, 4 pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/021,448, dated Dec. 13, 2012, 9 pages.
"Non-Final Office Action", U.S. Appl. No. 13/471,001, dated Feb. 19, 2013, 15 pages.
"Non-Final Office Action", U.S. Appl. No. 13/471,139, dated Mar. 21, 2013, 12 pages.
"Non-Final Office Action", U.S. Appl. No. 13/471,202, dated Feb. 11, 2013, 10 pages.
"Non-Final Office Action", U.S. Appl. No. 13/471,336, dated Jan. 18, 2013, 14 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Jun. 19, 2013, 8 pages.
"Non-Final Office Action", U.S. Appl. No. 13/565,124, dated Jun. 17, 2013, 5 pages.
"Non-Final Office Action", U.S. Appl. No. 13/599,763, dated May 28, 2014, 6 pages.
"Non-Final Office Action", U.S. Appl. No. 13/603,918, dated Sep. 2, 2014, 13 pages.
"Non-Final Office Action", U.S. Appl. No. 13/603,918, dated Dec. 19, 2013, 12 pages.
"Non-Final Office Action", U.S. Appl. No. 13/645,405, dated Jan. 31, 2014, <!Refpages**>.
"Non-Final Office Action", U.S. Appl. No. 13/645,405, dated Aug. 11, 2014, 5 pages.
"Non-Final Office Action", U.S. Appl. No. 13/647,479, dated Jul. 3, 2014, 10 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.
"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/653,321, dated Feb. 1, 2013, 13 pages.
"Non-Final Office Action", U.S. Appl. No. 13/653,682, dated Feb. 7, 2013, 11 pages.
"Non-Final Office Action", U.S. Appl. No. 13/653,682, dated Jun. 3, 2013, 14 pages.
"Non-Final Office Action", U.S. Appl. No. 13/655,065, dated Apr. 24, 2014, 16 pages.
"Non-Final Office Action", U.S. Appl. No. 13/655,065, dated Aug. 19, 2015, 18 pages.
"Non-Final Office Action", U.S. Appl. No. 13/655,065, dated Dec. 19, 2014, 24 pages.
"Non-Final Office Action", U.S. Appl. No. 13/656,055, dated Apr. 23, 2013, 11 pages.

(56) References Cited

OTHER PUBLICATIONS

"Non-Final Office Action", U.S. Appl. No. 13/656,520, dated Feb. 1, 2013, 15 pages.
"Non-Final Office Action", U.S. Appl. No. 13/656,520, dated Jun. 5, 2013, 8 pages.
"Non-Final Office Action", U.S. Appl. No. 13/759,875, dated Aug. 1, 2014, 16 pages.
"Non-Final Office Action", U.S. Appl. No. 13/782,137, dated Jan. 30, 2015, 12 pages.
"Non-Final Office Action", U.S. Appl. No. 13/782,137, dated Oct. 6, 2015, 20 pages.
"Non-Final Office Action", U.S. Appl. No. 13/974,749, dated Feb. 12, 2015, 15 pages.
"Non-Final Office Action", U.S. Appl. No. 13/974,749, dated May 8, 2014, 16 pages.
"Non-Final Office Action", U.S. Appl. No. 13/974,994, dated Jan. 23, 2015, 26 pages.
"Non-Final Office Action", U.S. Appl. No. 13/974,994, dated Jun. 4, 2014, 24 pages.
"Non-Final Office Action", U.S. Appl. No. 13/975,087, dated Feb. 27, 2015, 20 pages.
"Non-Final Office Action", U.S. Appl. No. 13/975,087, dated May 8, 2014, 18 pages.
"Non-Final Office Action", U.S. Appl. No. 14/033,510, dated Feb. 12, 2015, 17 pages.
"Non-Final Office Action", U.S. Appl. No. 14/033,510, dated Jun. 5, 2014, 16 pages.
"Non-Final Office Action", U.S. Appl. No. 14/144,876, dated Jun. 10, 2015, 23 pages.
"Notice of Allowance", U.S. Appl. No. 13/470,633, dated Mar. 22, 2013, 7 pages.
"Notice of Allowance", U.S. Appl. No. 13/471,202, dated May 28, 2013, 7 pages.
"Notice of Allowance", U.S. Appl. No. 13/599,763, dated Feb. 18, 2015, 4 pages.
"Notice of Allowance", U.S. Appl. No. 13/603,918, dated Jan. 22, 2015, 8 pages.
"Notice of Allowance", U.S. Appl. No. 13/651,195, dated Jul. 8, 2013, 9 pages.
"Notice of Allowance", U.S. Appl. No. 13/651,272, dated May 2, 2013, 7 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>, Nov. 2010, pp. 1-13.
"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010, Jan. 1, 2010, 3 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/603,918, dated Nov. 27, 2013, 8 pages.
"Restriction Requirement", U.S. Appl. No. 13/471,139, dated Jan. 17, 2013, 7 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 13/715,229, dated Aug. 13, 2013, 7 pages.
"Second Written Opinion", Application No. PCT/US2014/068687, dated Nov. 12, 2015, 6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"Snugg iPad 3 Keyboard Case—Cover Ultra Slim Bluetooth Keyboard Case for the iPad 3 & iPad 2", Retrieved from <https://web.archive.org/web/20120810202056/http://www.amazon.com/Snugg-iPad-Keyboard-Case-Bluetooth/dp/B008CCHXJE> on Jan. 23, 2015, Aug. 10, 2012, 4 pages.
"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012, 2011, 4 pages.
"Tactile Feedback Solutions Using Piezoelectric Actuators", Available at: http://www.eetimes.com/document.asp?doc_id=1278418, Nov. 17, 2010, 6 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Visus Photonics—Visionary Technologies New Generation of Production Ready Keyboard-Keypad Illumination Systems", Available at: <http://www.visusphotonics.com/pdf/appl_keypad_keyboard_backlights.pdf>, May 2006, pp. 1-22.
"What is Active Alignment?", http://www.kasalis.com/active_alignment.html, retrieved on Nov. 22, 2012, Nov. 22, 2012, 2 Pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.
Akamatsu,"Movement Characteristics Using a Mouse with Tactile and Force Feedback", in Proceedings of International Journal of Human-Computer Studies 45, No. 4, Oct. 1996, 11 pages.
Bathiche,"Input Device with Interchangeable Surface", U.S. Appl. No. 13/974,749, Aug. 23, 2013, 51 pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Boulanger,"Method and System for Controlling of an Ambient Multiple Zones Haptic Feedback on Mobile Devices (W231)", U.S. Appl. No. 14/298,658, filed Jun. 6, 2014., 34 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.

(56) References Cited

OTHER PUBLICATIONS

Chu,"Design and Analysis of a Piezoelectric Material Based Touch Screen With Additional Pressure and Its Acceleration Measurement Functions", In Proceedings of Smart Materials and Structures, vol. 22, Issue 12, Nov. 1, 2013, 2 pages.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.
Gaver,"A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012, May 7, 1995, 9 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Gong,"PrintSense: A Versatile Sensing Technique to Support Multimodal Flexible Surface Interaction", In Proceedings of the SIGCHI Conference on Human Factors in Computing Systems; retrieved from: http://dl.acm.org/citation.cfm?id=2556288.2557173&coll=DL&dl=ACM&CFID=571580473&CFTOKEN=89752233 on Sep. 19, 2014, Apr. 26, 2014, 4 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Harada,"VoiceDraw: A Hands-Free Voice-Driven Drawing Application for People With Motor Impairments", In Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf> on Jun. 1, 2012, Oct. 15, 2007, 8 pages.
Hinckley,"Touch-Sensing Input Devices", In Proceedings of ACM SIGCHI 1999, May 15, 1999, 8 pages.
Iwase,"Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, 7 pages.
Kaufmann,"Hand Posture Recognition Using Real-time Artificial Evolution", EvoApplications'09, retrieved from <http://evelyne.lutton.free.fr/Papers/KaufmannEvolASP2010.pdf> on Jan. 5, 2012, Apr. 3, 2010, 10 pages.
Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Lane,"Media Processing Input Device", U.S. Appl. No. 13/655,065, Oct. 18, 2012, 43 pages.
Li,"Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>, Feb. 2012, 13 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
Mackenzie,"The Tactile Touchpad", In Proceedings of the ACM CHI Human Factors in Computing Systems Conference Available at: <http://citeseerx.ist.psu.edu/viewdoc/download?doi=10.1.1.150.4780&rep=rep1&type=pdf>, Mar. 22, 1997, 2 pages.

Manresa-Yee,"Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012, Oct. 13, 2008, pp. 261-262.
McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
McPherson,"TouchKeys: Capacitive Multi-Touch Sensing on a Physical Keyboard", In Proceedings of NIME 2012, May 2012, 4 pages.
Miller,"MOGA gaming controller enhances the Android gaming experience", Retrieved from <http://www.zdnet.com/moga-gaming-controller-enhances-the-android-gaming-experience-7000007550/> on Nov. 20, 2012, Nov. 18, 2012, 9 pages.
Nakanishi,"Movable Cameras Enhance Social Telepresence in Media Spaces", In Proceedings of the 27th International Conference on Human Factors in Computing Systems, retrieved from <http://smg.ams.eng.osaka-u.ac.jp/~nakanishi/hnp_2009_chi.pdf> on Jun. 1, 2012, Apr. 6, 2009, 10 pages.
Picciotto,"Piezo-Actuated Virtual Buttons for Touch Surfaces", U.S. Appl. No. 13/769,356, filed Feb. 17, 2013, 31 pages.
Piltch,"ASUS Eee Pad Slider SL101 Review", Retrieved from <http://www.laptopmag.com/review/tablets/asus-eee-pad-slider-sl101.aspx>, Sep. 22, 2011, 5 pages.
Post,"E-Broidery: Design and Fabrication of Textile-Based Computing", IBM Systems Journal, vol. 39, Issue 3 & 4, Jul. 2000, pp. 840-860.
Poupyrev,"Ambient Touch: Designing Tactile Interfaces for Handheld Devices", In Proceedings of the 15th Annual ACM Symposium on User Interface Software and Technology Available at: <http://www.ivanpoupyrev.com/e-library/2002/uist2002_ambientouch.pdf>, Oct. 27, 2002, 10 pages.
Poupyrev,"Tactile Interfaces for Small Touch Screens", In Proceedings of the 16th Annual ACM Symposium on User Interface Softward and Technology, Nov. 2, 2003, 4 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
Reilink,"Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf> on Jun. 1, 2012, Sep. 26, 2010, pp. 510-515.
Rendl,"PyzoFlex: Printed Piezoelectric Pressure Sensing Foil", In Proceedings of the 25th Annual ACM Symposium on User Interface Software and Technology, Oct. 7, 2012, 10 pages.
Rubin,"Switched On: The Bedeviled Bezel", Retrieved from: http://www.engadget.com/2011/07/17/switched-on-the-bedeviled-bezel/— on Nov. 19, 2015, Jul. 17, 2011, 4 pages.
Shaw,"Input Device Configuration having Capacitive and Pressure Sensors", U.S. Appl. No. 14/033,510, filed Sep. 22, 2013, 55 pages.
Staff,"Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Sundstedt,"Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedt.pdf> on Jun. 1, 2012, Jul. 28, 2010, 85 pages.

(56) References Cited

OTHER PUBLICATIONS

Takamatsu,"Flexible Fabric Keyboard with Conductive Polymer-Coated Fibers", In Proceedings of Sensors 2011, Oct. 28, 2011, 4 pages.
Titus,"Give Sensors a Gentle Touch", http://www.ecnmag.com/articles/2010/01/give-sensors-gentle-touch, Jan. 13, 2010, 6 pages.
Travis,"Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, Oct. 15, 2009, 6 pages.
Travis,"The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.
Valli,"Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.
Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.
Vaucelle,"Scopemate, a Robotic Microscope!", Architectradure, retrieved from <http://architectradure.blogspot.com/2011/10/at-uist-this-monday-scopemate-robotic.html> on Jun. 6, 2012, Oct. 17, 2011, 2 pages.
Williams,"A Fourth Generation of LCD Backlight Technology", Retrieved from <http://cds.linear.com/docs/Application%20Note/an65f.pdf>, Nov. 1995, 124 pages.
Xu,"Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012, Feb. 8, 2009, 5 pages.
Xu,"Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012, Dec. 5, 2009, pp. 223-226.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
Zhu,"Keyboard before Head Tracking Depresses User Success in Remote Camera Control", In Proceedings of 12th IFIP TC 13 International Conference on Human-Computer Interaction, Part II, retrieved from <http://csiro.academia.edu/Departments/CSIRO_ICT_Centre/Papers?page=5> on Jun. 1, 2012, Aug. 24, 2009, 14 pages.
"Final Office Action", U.S. Appl. No. 13/782,137, dated Feb. 10, 2016, 21 pages.
"Final Office Action", U.S. Appl. No. 14/144,876, dated Feb. 3, 2016, 27 pages.
"International Preliminary Report on Patentability", Application No. PCT/US2014/068687, dated Mar. 11, 2016, 7 pages.
"Corrected Notice of Allowance", U.S. Appl. No. 14/698,318, dated Jun. 9, 2016, 2 pages.
"International Search Report and Written Opinion", Application No. PCT/US2016/025966, dated Jun. 15, 2016, 15 pages.
"Non-Final Office Action", U.S. Appl. No. 13/782,137, dated Jun. 8, 2016, 22 pages.
"Notice of Allowance", U.S. Appl. No. 14/698,318, dated May 6, 2016, 13 pages.
"Supplemental Notice of Allowance", U.S. Appl. No. 14/698,318, dated Aug. 15, 2016, 2 pages.
"Non-Final Office Action", U.S. Appl. No. 14/144,876, dated Jul. 6, 2016, 33 pages.
"Final Office Action", U.S. Appl. No. 13/782,137, dated Dec. 29, 2016, 24 pages.
"Second Written Opinion", Application No. PCT/US2016/025966, dated Mar. 14, 2017, 7 pages.
"Foreign Office Action", CN Application No. 201480009165.3, dated Apr. 12, 2017, 16 pages.
"Non-Final Office Action", U.S. Appl. No. 13/782,137, dated May 19, 2017, 27 pages.
"Non-Final Office Action", U.S. Appl. No. 15/269,594, dated Jun. 7, 2017, 27 pages.
"International Preliminary Report on Patentability", Application No. PCT/US2016/025966, dated May 22, 2017, 8 pages.
"Using a Force Touch trackpad", Retrieved fromhttps://support.apple.com/en-in/HT204352, Nov. 17, 2015, 3 Pages.
"Final Office Action Issued in U.S. Appl. No. 13/647,479", dated Sep. 17, 2015, 11 Pages.
"Non-Final Office Action Issued in U.S. Appl. No. 13/647,479", dated Apr. 28, 2015, 11 Pages.
"Final Office Action Issued in U.S. Appl. No. 13/655,065", dated Nov. 17, 2015, 25 Pages.
"Final Office Action Issued in U.S. Appl. No. 13/759,875", dated Mar. 27, 2015, 19 Pages.
"Final Office Action Issued in U.S. Appl. No. 13/974,749", dated Mar. 23, 2016, 22 Pages.
"Non- Final Office Action Issued in U.S. Appl. No. 13/974,749", dated Dec. 3, 2015, 21 Pages.
"Examiner's Answer to Appeal Brief Issued in U.S. Appl. No. 13/974,994", dated May 18, 2016, 40 Pages.
"Non Final Office Action Issued in U.S. Appl. No. 13/975,087", dated May 10, 2016, 19 Pages.
"Non-Final Office Action Issued in U.S. Appl. No. 14/033,290", dated Dec. 3, 2015, 8 Pages.
"Non-Final Office Action Issued in U.S. Appl. No. 14/033,508", dated Dec. 3, 2015, 15 Pages.
"Final Office Action Issued in U.S. Appl. No. 14/033,510", dated Feb. 8, 2016, 28 Pages.
"Non-Final Office Action Issued in U.S. Appl. No. 14/033,510", dated Oct. 7, 2015, 24 Pages.
"Final Office Action Issued in U.S. Appl. No. 14/591,704", dated Nov. 25, 2016, 33 Pages.
"Non-Final Office Action Issued in U.S. Appl. No. 14/591,704", dated Mar. 10, 2017, 26 Pages.
"Non-Final Office Action Issued in U.S. Appl. No. 14/591,704", dated Jun. 7, 2016, 34 Pages.
"Final Office Action Issued in U.S. Appl. No. 14/697,501", dated Apr. 18, 2016, 14 Pages.
"Non Final Office Action Issued in U.S. Appl. No. 14/697,501", dated Sep. 29, 2015, 11 Pages.
"Final Office Action Issued in U.S. Appl. No. 14/729,793", dated Dec. 1, 2017, 17 Pages.
"Non-Final Office Action Issued in U.S. Appl. No. 14/729,793", dated Mar. 31, 2017, 14 Pages.
"Non-Final Office Action Issued in U.S. Appl. No. 15/004,423", dated Jun. 29, 2017, 17 Pages.
"Non-Final Office Action Issued in U.S. Appl. No. 15/283,913", dated Feb. 10, 2017, 20 Pages.
"First Office Action Issued in Chinese Patent Application No. 201210085821.0", dated May 5, 2016, 18 Pages.
"First Office Action and Search Report Issued in Chinese Patent Application No. 201310316114.2", dated Sep. 29, 2015, 13 Pages.
"Second Office Action Issued in Chinese Patent Application No. 201310316114.2", dated Apr. 18, 2016, 10 Pages.
"Forth Office Action Issued in Chinese Patent Application No. 201480009165.3", dated Aug. 16, 2019, 11 Pages.
"Office Action Issued in Chinese Patent Application No. 201480009165.3", dated Nov. 2, 2018, 12 Pages.
"Second Office Action Issued in Chinese Patent Application No. 201480009165.3", dated Dec. 1, 2017, 14 Pages.
"Third Office Action Issued in Chinese Patent Application No. 201480009165.3", dated Jun. 4, 2018, 19 Pages.
Betters, Elyse, "What is Force Touch? Apple's Haptic Feedback Technology Explained", Retrieved from https://web.archive.org/web/20150313103330/http://www.pocket-lint.com/news/133176-what-is-force-touch-apple-s-haptic-feedback-technology-explained, Mar. 11, 2015, 8 Pages.

(56) References Cited

OTHER PUBLICATIONS

De Rosa, Aurelio, "HTML5: Vibration API", Retrieved fromhttps://code.tutsplus.com/tutorials/html5-vibration-api—mobile-22585, Mar. 10, 2014, 11 Pages.

Kadlecek, Petr, "Overview of Current Developments in Haptic APIs", In Proceedings of 15th Central European Seminar on Computer Graphics, May 2, 2011, 8 Pages.

Odegard, "My iPad MagPad Concept", Retrieved from http://www.pocketables.com/2011/02/my-ipad-magpad-concept.html, Feb. 26, 2011, 8 Pages.

"Second Written Opinion Issued in PCT Application No. PCT/US2014/016151", dated Jan. 29, 2015, 6 Pages.

"International Preliminary Report on Patentability Issued in PCT Application No. PCT/US2014/016743", dated Sep. 7, 2015, 7 Pages.

"International Preliminary Report on Patentability Issued in PCT Application No. PCT/US2014/056185", dated Dec. 23, 2015, 7 Pages.

"Second Written Opinion Issued in PCT Application No. PCT/US2014/056185", dated Sep. 15, 2015, 5 Pages.

"International Preliminary Report on Patentability Issued in PCT Application No. PCT/US2015/067754", dated Jan. 10, 2017, 10 Pages.

"International Search Report and Written Opinion Issued in PCT Application No. PCT/US2015/067754", dated Apr. 7, 2016, 13 Pages.

"Second Written Opinion Issued in PCT Application No. PCT/US2015/067754", dated Nov. 25, 2016, 8 Pages.

"International Search Report and Written Opinion Issued in PCT Application No. PCT/US2016/028191", dated Jun. 29, 2016, 14 Pages.

"International Preliminary Report on Patentability Issued in PCT Application No. PCT/US2016/031699", dated Feb. 22, 2017, 6 Pages.

"International Search Report and Written Opinion Issued in PCT Application No. PCT/US2016/031699", dated Nov. 11, 2016, 23 Pages.

"International Search Report and Written Opinion Issued in PCT Application No. PCT/US2017/013583", dated Apr. 19, 2017, 13 Pages.

"Written Opinion Issued in PCT Application No. PCT/US2017/013583", dated Aug. 2, 2018, 7 Pages.

Rendl, et al., "Presstures: Exploring Pressure-Sensitive Multi-Touch Gestures on Trackpads", In Proceedings of the SIGCHI Conference on Human Factors in Computing Systems, Apr. 26, 2014, pp. 431-434.

"First Office Action and Search Report Issued in Chinese Patent Application No. 201680024928.0", dated Oct. 18, 2019, 17 Pages.

* cited by examiner

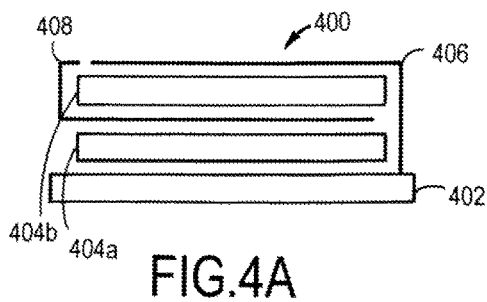 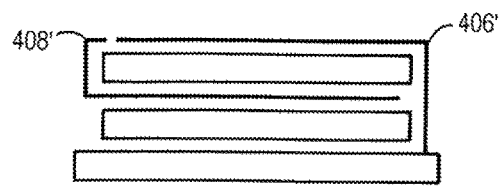
FIG.4A  FIG.4B
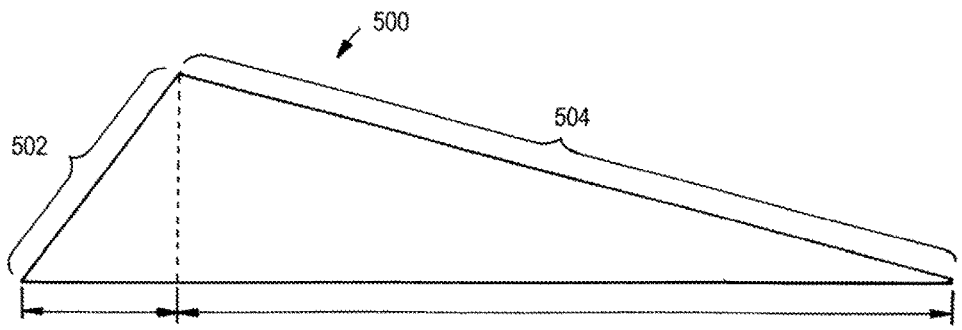
FIG.5A
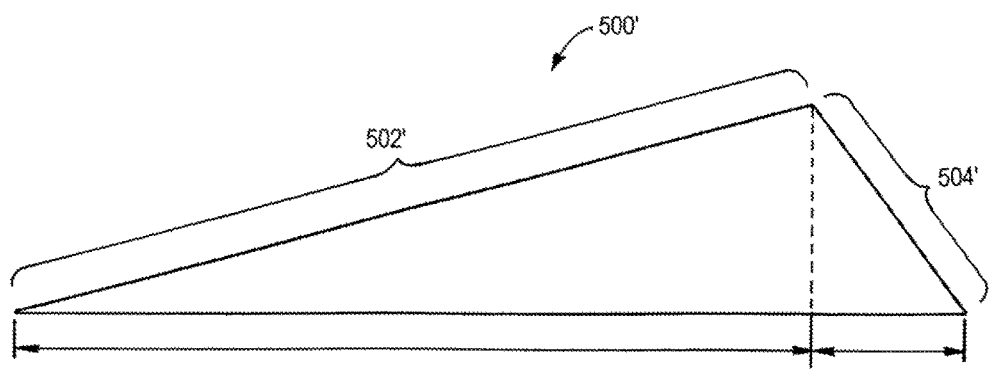
FIG.5B

PIEZO-ACTUATED VIRTUAL BUTTONS FOR TOUCH SURFACES

BACKGROUND

In the area of touch sensitive screens, it is known to have touch actuation affected by capacitive interactions between the human touch (as the human body has a known capacitance) and the screen. Capacitive sensors in the screen may be able to detect slight changes in capacitances that differ from the air. As a result, capacitive sensor may be able to detect proximity, position, displacement and the like.

However, to employ capacitive technology to actuating "buttons" on a touch screen surface may tend to have certain challenges. For example, capacitive buttons may tend to feel different from authentic mechanical buttons that have an "up" and "down" feel to their actuation. Capacitive buttons may also have a high number of "false" readings—i.e., they may poorly indicate to the system (which detecting touches and interpreting their meaning) that the user has intended to push a virtual button on the screen.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods of creating a touch sensitive surface structure comprising a piezo structure in communication with a deformable surface such that the piezo structure, or any suitable pressure sensing device, is capable of sensing pressure from a touch upon the deformable surface and communicating that pressure signal to an actuating circuit. The actuating circuit, upon receiving a suitable pressure signal, sends a piezo actuating signal to the piezo structure. The piezo structure, upon receiving the piezo actuating signal, is capable of communicating a mechanical signal to the deformable surface, sufficient for a person's finger to feel a "click" and/or haptic sensation. In one embodiment, the piezo actuating signal comprises a first slow charging portion and a second fast discharging portion, sufficient for the piezo structure to communicate the click and/or haptic sensation.

In one embodiment, a piezo-actuated structure is disclosed, said structure comprising: a deformable layer; a piezo layer, said piezo layer mechanically mated to said deformable layer; wherein said piezo layer (or a suitable pressure sensing device) is capable of sensing pressure applied to said deformable layer; and further wherein said piezo layer is capable of transmitting a haptic response to said deformable layer in response to said pressure.

In another embodiment, a method for actuating a piezo-actuated structure is disclosed, said piezo-actuated structure comprising a piezo layer, a deformable layer, a pressure sensing device, said piezo layer mechanically mated to said deformable layer, the method comprising: receiving a first pressure applied to said deformable layer; communicating said first pressure to said pressure sensing device; sending a pressure detection signal to a sensing circuit; in response to said pressure detection signal, sending a piezo actuating signal from an actuation circuit to said piezo layer; and communicating a mechanical signal to said deformable layer by movement of said piezo layer in response to said piezo actuating signal.

In yet another embodiment, a touch sensitive surface structure comprising: a touch sensitive surface, said touch sensitive surface further comprising a deformable layer; a piezo layer, said piezo layer in mechanical communication with said deformable layer; a pressure sensing device, such that a first pressure of a desired amount is sufficient for said pressure sensing device to send a first pressure sensing signal; a sensing circuit, said sensing circuit in electrical communication with said pressure sensing device and further wherein said sensing circuit capable of detecting said first electrical sensing signal and a piezo actuating circuit, said piezo actuating circuit in electrical communication with said sensing circuit and said piezo layer and further wherein piezo actuating circuit is capable of sending a piezo actuating signal to said piezo layer upon receiving a pressure sensing signal from said sensing circuit.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A and 4B depict two embodiments of control lines for a structure comprising a piezo structure and capacitive sensing structure.

FIGS. 5A and 5B depict two embodiments of waveforms for signals driving piezo structures, as made in accordance with the principles of the present application.

DETAILED DESCRIPTION

Figure 1A:
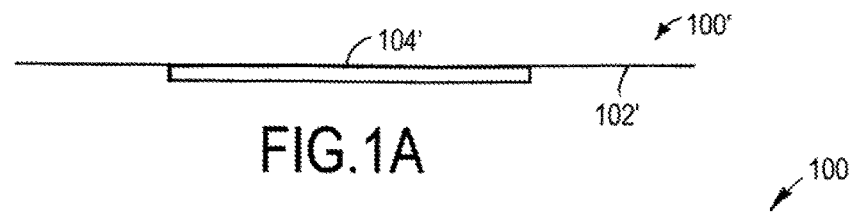
FIGS. 1A and 1B are two embodiments of piezo-actuated structures mated to a deformable layer on a touch sensitive surface, as made in accordance with the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In many embodiments of the present system, a piezo-actuated bender may be employed to provide suitable virtual button actuation. In preferred embodiments "piezo" may refer to benders employing piezoceramic materials, for example PZT, but it may also refer to benders employing other piezoelectric materials such as electroactive polymers or electromechanical polymers. The bender may be in whatever form (e.g., a bar, disk, or any other desired shape) is convenient for the application (e.g., home button on a touch-sensitive tablet, a virtual button or the like). In many embodiments, such piezo-actuated bender may be mechanically mated (e.g., glued, affixed by support structures or the like) to the surface of a suitably bendable touch surface—e.g., thin glass, plastic or the like—in order to simulate a "dome switch", mechanical button or some other haptic sensation.

Such a piezo-actuated button and/or bender may be able to sense finger pressure and/or position—for, e.g., sensing an intentional button actuation by the user and/or to prevent unintentional button actuation. In other embodiments, it may be possible to employ one or more capacitive sensors (in addition to the piezo-actuated bender/button) to aid in sensing finger position, pressure and motion for decreasing the incidence of such false-positives (i.e., failing to detect an inadvertent user actuation) and false-negatives (i.e. failing to detect an intentional user actuation).

In other embodiments, apart from pressure sensing from piezo-layers and/or structures, it may be possible to incorporate other sensing devices—for example, force sensitive resistors (FSR), piezo-resistive elements, capacitive sensing and/or any other devices, means and/or methods known in the art. These pressure-sensing devices may be incorporated with the piezo structures mentioned herein—and may be used in any combination possible. In fact, one embodiment may be to sense pressure with a non-piezo based structure (even though the piezo structure may be capable of sensing pressure itself). It may suffice for the purposes of the present application that pressure-sensing capability be possible with many of the embodiments disclosed herein.

In other embodiments, it may be possible to use orientation sensors to inform the system (e.g., smart phone or tablet using such a touch screen) when button pushes may be valid or invalid. It may also be desirable to have the system allow a digital pen/pencil to disable and prevent actuation when such digital pen/pencil is in use.

Embodiments of Piezo-Actuated Structures

Figure 1B:
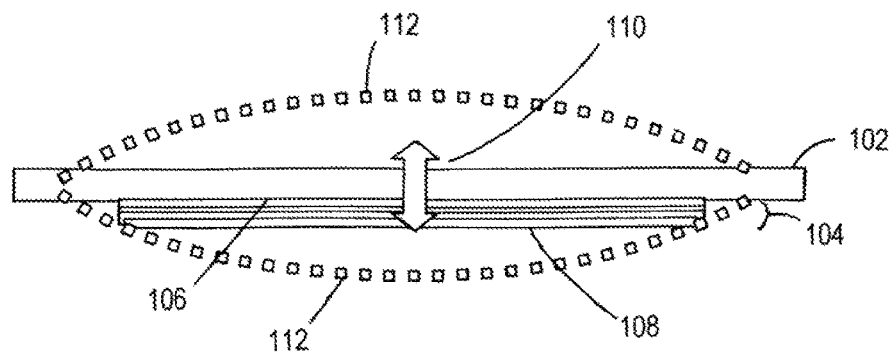

FIGS. 1A and 1B are two possible embodiments (100' and 100, respectively) of piezo-actuated structures (104', 104) mated to a deformable layer (102', 102)—e.g., such as on a touch sensitive surface. As shown, piezo-actuated structures may comprise a single (104') or multi-layered (104) structures, depending on various factors, including the manner of mechanical mating to the piezo structure to deformable layer (102', 102). In this embodiment, it is possible to achieve a suitable mechanical mating with an adhesive layer 106. Adhesive layer 106 bonds piezo actuator 108 to deformable layer 102. Deformable layer (102', 102) may comprise glass (e.g. "Gorilla Glass") or some transparent/translucent plastic layer suitable for a transparent display.

In one embodiment, deformable layer (102', 102) should be of a suitable thickness (e.g., depending upon the material used), such that an average depression (e.g., a user pressing a finger) allows a suitable deformation 112 to allow detection by a sensor and/or circuit, as will be discussed herein.

Figure 2A:
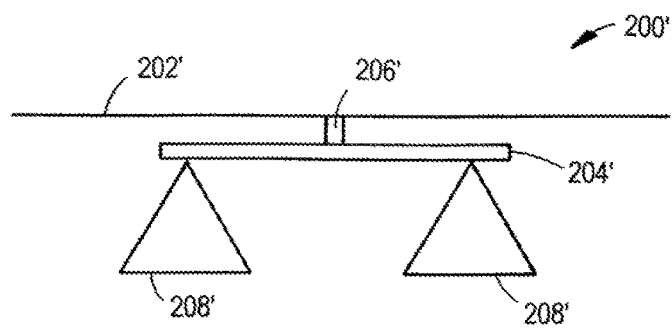
FIGS. 2A and 2B depict two other embodiments of a piezo-actuator structures that may suffice for a touch sensitive surface, as made in accordance with the principles of the present application.
Figure 2B:
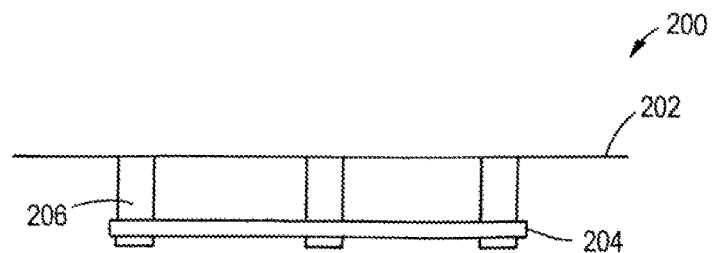

FIGS. 2A and 2B are other embodiments of suitable piezo-actuator structures (200' and 200, respectively) that may suffice for a touch sensitive surface 200. As with FIG. 1, deformable layer (202', 202) provides suitable deformation/deflection upon actuation by the piezo layer (204', 204), and by a touch from a user, if pressure sensing is to be employed. Piezo layer (204', 204) may be mechanically mated to deformable layer (202', 202) as before, with any known mechanical mating (e.g., adhesive, gluing, chemical bonding, mechanical fixtures or the like), or simply positioned to push, particularly at its center point.

In FIG. 1A, piezo layer 204' is also in mechanically communication to layer 202' via a pusher structure 206'—which may also communicate pressure from touches or piezo actuation. Piezo layer 204' is also supported by support structures 208', as seen in FIG. 1A. Support structures may be mechanically mated to the piezo layer and/or may be in mechanical communications (e.g., touching) the piezo layer.

In FIG. 1B, there is a plurality of stood-off mounting portions 206. Mounting portions 206 may position the piezo away from the deformable layer 202 to allow the piezo to bend at an optimal radius, while pushing deformable layer 202 about the center point of piezo layer 204. Mounting portions 206 may provide a sufficient amount of electrical and/or mechanical insulation or damping from surrounding piezo and/or capacitive structures. In addition, mounting portions 206 may be constructed to provide mechanical dampening of deformations from user touches in the near vicinity—e.g., a touch meant for one area of the touch surface but which may be confused for a touch meant for a different piezo structures.

In one embodiment, it may be desirable to simulate a "virtual dome switch". Such a switch may comprise a piezo bender (as shown in FIGS. 1 and 2), glued to (or mounted against) the underside of glass (for example, Gorilla Glass at about 0.55 mm thickness)—and which, when stimulated with an electrical pulse and/or waveform, bends the glass and transmits a sharp feeling to a person's finger, simulating the experience of an actuated dome switch. In one embodiment the pulse is produced upon both the press and release of the person's finger, thus creating complete in/out dome switch experience. In other embodiments, the pulse may be produced only upon press (or only upon release) to simulate other types of switches or under light touches to provide sensations of the surface texture to help people locate the button before actuation—e.g., when in the dark or not looking directly at the button Embodiments for Piezo Actuation In addition to the embodiments mentioned in FIGS. 1A, 1B and 2A and 2B above, there are several ways in which the piezo bender and/or bar may be implemented. When a voltage is applied to a piezo bar, the piezo bar tries to elongate or foreshorten. Using this effect, there are two possible implementations may be realized either as a "unimorph" configuration or, alternatively, as a "bimorph" configuration.

In a unimorph configuration, a single piezo bar may be mated (e.g. by gluing or otherwise affixing in any known manner) to a rigid backing. By contrast, in a bimorph configuration, two piezo-structures may be glued, mechanically mated and/or otherwise layered on top of each other. If two piezos are glued on top of each other, and if one piezo foreshortens while the other elongates, then the whole structure will bend.

Figure 3A:
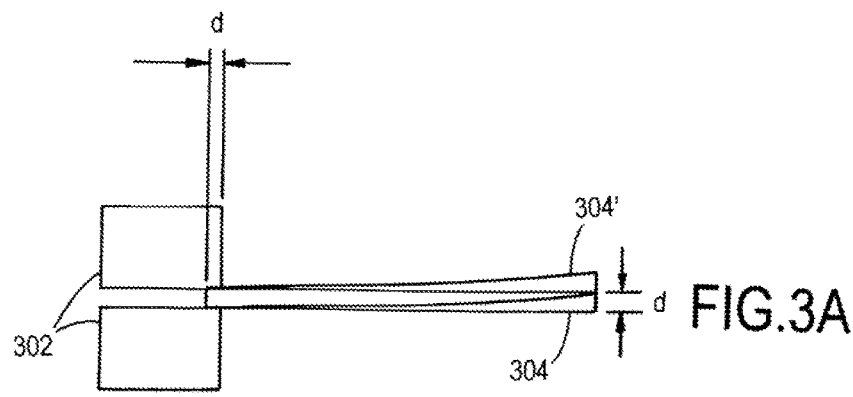
FIG. 3A depicts one embodiment of a piezo structure as made in a cantilever configuration.

A bimorph configuration may work well in a three-point-mounting configuration (as depicted in FIG. 2A), where it may not be desirable to glue the bar along its length to a rigid structure. Alternatively, a unimorph or a bimorph configuration may work in a cantilever configuration (as depicted in FIG. 3A). In FIG. 3A, piezo structure 304 may be mated to a clapping fixture 302 (e.g., embedded to a depth of d, as shown—and as desired to affect the suitable deflection). Piezo 304 may comprise a free end that allows for a displacement (shown as 304') when actuated.

One Embodiment

In the embodiment whereby a piezo bar is glued along the entire length of the glass, it may be desired to allow the glass sufficient freedom of movement to bend. To affect this, it may be desired to provide for a gap depth in the adhesive securing the glass to any nearby structures, such as a bezel or frame.

With this gap depth (e.g., 20 mm), it may be possible to achieve a suitable deflection range (e.g. possibly 10-12 um deflection) for piezo bar driven at a desired voltage (e.g. 30V). At higher voltage (e.g., 60V), it may be possible to achieve a larger deflection (e.g., 18-20 um). In one embodiment, it may be desirable to achieve an effective glass stiffness of approximately 40N/mm.

As in some embodiments, a larger gap may not necessarily provide greater flexibility—while a smaller gap may reduce flexibility. A gap of zero, however, may tend to constrict the glass to very small deflections (e.g., 2-3 microns at 30V). Such different configurations are possible; but it may be desirable to implement the sensing elements to perform for these various displacements.

To better understand the operation of the piezo bar, the piezo bar may be characterized in terms of:
 (1) BF (blocking force): the force exerted by the bar when constrained and not allowed to move; and
 (2) FD (free displacement): the displacement of the bar when totally unopposed.

These specifications have a particular context (as depicted in FIG. 3A). However, these specifications apply in the configuration where the piezo bar is glued (or otherwise mated) to the glass along the length, and the deflection occurs in the middle (e.g., "three-point mounting", whereby the two ends and the center point are mechanically mated). The stiffness of the piezo bar may be derived from BF/FD. With BF and FD, it may be possible to know the stiffness of the load and possible to calculate (or otherwise model) the deflection from a static standpoint (i.e. where the inertial effects of mass may be ignored and just consider balanced forces at steady state).

Haptic Response

With these configurations, it may be possible to create a haptics response for a virtual button that: (1) may be localized to the finger; (2) may be felt in any of the touch screen's orientations (e.g., in the hand, flat on the table, in the user's lap, propped up on its stand on a table, etc.); (3) may not need mechanical isolation; and (4) may function under a continuous sheet of glass. In addition, these configurations may provide varies haptic response, for example to indicate finger proximity.

For example, in the embodiment comprising a piezo bar/bender mated to the underside of the glass, it may be possible to provide and/or transmit a haptic response such as a positive, localized click feeling. In this case, the bender bends the glass, and the user may feel this sensation on the fingertip. In addition, this embodiment may not require "mechanical isolation"—i.e., the need for the construction of a mechanically distinct structure.

Proximity Sensing and Activation on Pressure

As a piezo bar may be implemented as a wideband device, it may be driven in a variety of ways to create varying haptic feelings—e.g., from buzzes to clicks. It may also be used as a pressure sensor "for free," allowing for a different modality of virtual button interaction.

In one embodiment, it is possible to affect capacitive sensing ("capsense" or "capsensing") to work in conjunction with the piezo structures recited herein. Capsense may function as before, may be used to detect proximity, and trigger a haptic buzz, thus, aiding the user in locating the button. Pressure sensing of the piezo structure may aid in determining actual button actuation. Haptics—working in conjunction with pressure—may give a very convincing virtual button and/or dome switch feeling.

In one embodiment, to impart a strong click feeling, it may be possible to account for peak surface velocity, as another possible control parameter, such as peak surface deflection. For example, in one embodiment, a target for peak velocity around 20-30 mm/sec may suffice for such effect.

Figure 3B:
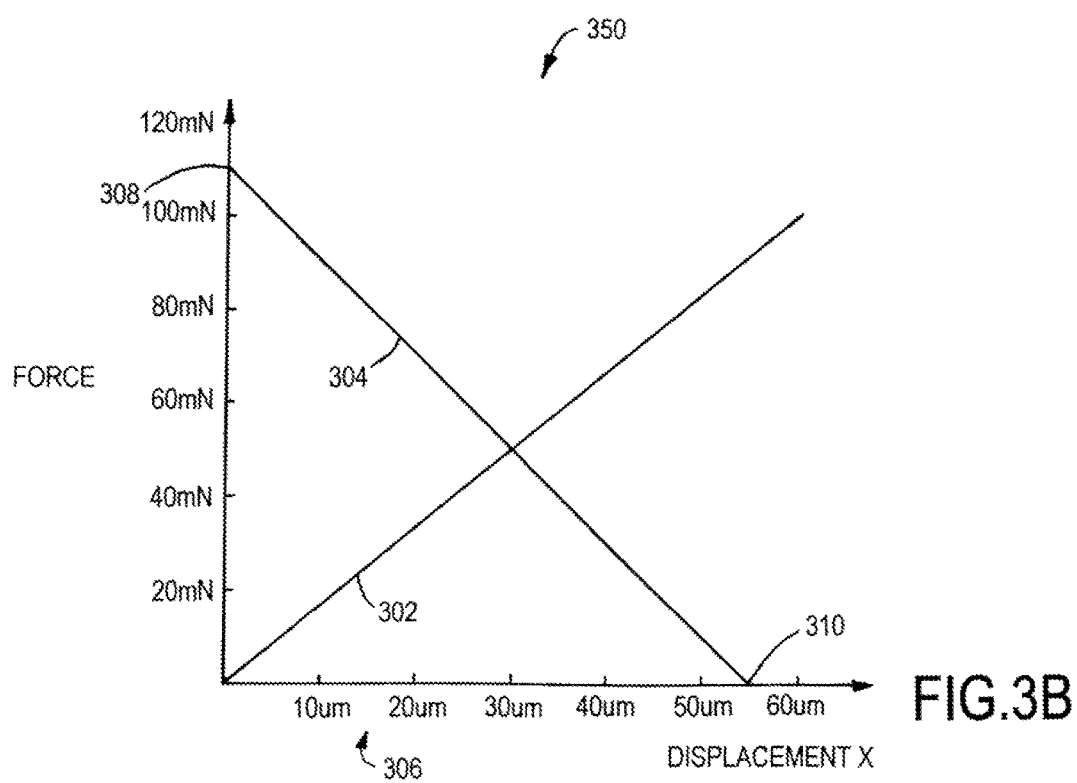
FIG. 3B depicts a graph of force vs. displacement of one embodiment of a piezo structure.

In this embodiment, it may be desired to have a suitable deflection. FIG. 3B is a graph of force vs. displacement modeled for one embodiment. As seen, a displacement of around 10 um may be desired in order to sense actuation—with 20-30 um being a more comfortable operating point.

In the graph of FIG. 3B, the load is represented by line 302, and the BF/FD performance of the piezo is represented by line 304. The resultant deflection is given by where the lines cross, where the force balances.

In this example, at a BF of 0.6N, a FD of 60-microns, and a glass load of 40N/mm, the deflection is approximately 12 um. Of course, a different piezo bar may be designed to meet a desired deflection. For example, a bar with greater BF and smaller FD might cross the line at the same point. Thus, some designing may go into matching a piezo bar to a load of known stiffness and mass, while optimizing deflections and velocities.

In some embodiments, it may be desirable to have a piezo bar that leans towards greater BF, to accommodate greater stiffness in the glass, if needed, to provide a little margin. In addition, BF and FD may be affected by changing piezo geometries. In FIG. 3B, for a particular piezo device, 308 shows the BF (the force at zero displacement 306), and 310 shows the free displacement, the unopposed static displacement.

Embodiments Using Capsense with Piezo Structures

As mentioned above, it may be possible and/or desirable to employ capsense in conjunction with piezo-actuation. In such embodiments, it may be desired to shield the capsense from piezo driving signals. In a piezo structure, there may be a plurality of ways to provide piezo signals. For example, FIG. 4A is one possible embodiment of control lines for a piezo structure comprising piezos 404a and 404b. Metal carrying plate 402 (which may face the glass surface) may provide grounding and possibly serve as a shield. Control signal lines 406 and 408 as shown in FIG. 4A may not be optimally designed, however. As shown, line 406 is driven to 50V and may allow electrical interference with neighboring capsense lines. However, in FIG. 4B, if the polarities of lines 406 and 408 are reversed (as in lines 406' and 408'), then line 406' is at ground—and may prevent noise coupling to the capsense lines.

Piezo Driving Signals

In order to affect the feeling of a sharp button click for the piezo-actuators, it may be possible to create such a feeling from a high velocity deflection of the piezo structure. Embodiment for creating that feeling may be affected by using a fast ramp for the piezo driving signals.

FIGS. 5A and 5B are two possible embodiments of such a driving signal for a suitable piezo structure. In FIG. 5A, it may be seen that there are two ramps for charging/energizing the piezo structure—a first high-velocity (e.g., fast) charging ramp 502 (up to a first charging level—e.g., substantially in the range of 30-75V), followed by a slower decaying and/or discharging (e.g. slow) ramp 504. With this type of driving signal to the piezo structure, a click sensation occurs during the high-velocity portion 502 of the waveform. During slower decaying portion 504, the finger may tend to feel nothing or have a much less sensation.

Alternatively, in FIG. 5B, it is possible to have a slower charging/energizing ramp 502' (up to a first charging level—e.g., substantially in the range of 30-75V), followed by a high-velocity decaying ramp 504'. As before, the click sensation tends to occur during the high-velocity portion of the waveform, 504', at the end. The finger tends to feel nothing (or have a much less sensation) during the charging ramp.

Although both drive signals are possible for the present systems, the drive signal of FIG. 5B may be desirable from the standpoint of limiting the size of the current pulses. For some designs, the limit may be in the range of 100-200 mA. It may be desirable to reach the first charging level over a longer time period (e.g. longer than 1-2 ms ramp) to stay within such current limits. Thus, while it may be possible to reduce the current draw spikes with large storage caps, it may be desirable to avoid the added expense and board area requirements.

In other embodiments, it may be possible to design a PWM to drive the charge cycle, and a separate PWM to drive the discharge cycle. Due to the practical limitations of the driving circuit, or the desire to create other sensations (such as those that would be effective for proximity sensing), it may be desirable to construct driving signals using asymmetrical triangles (or other asymmetrical wave forms) as the basis functions. Varying heights, varying charge and discharge times, as well as varying the pulse-width schedule of the PWM driving the switcher, are all possible variations to affect different sensations.

In one embodiment, during a click event, the piezo may first be charged by generating a PWM that drives a simple FET/inductor/diode boost circuit. The PWM "on" time may be matched to the characteristics of the discrete components—e.g., it may be the time desired to establish max current in the inductor. Leaving the FET turned on any longer may tend to waste power by shunting current to GND longer than suitable. The overall charge time may be controlled by varying the PWM period. The charge time may be controlled to limit the maximum current spikes taken from e.g., the system's battery.

In one embodiment, the charge cycle may be run open-loop—i.e., the PWM may be run for a fixed number of cycles (possibly determined heuristically or by experimentation) to charge the piezo to the desired voltage. However, the relationship between the final piezo voltage and the number of PWM cycles may depend on many variables in the system, including the actual piezo capacitance, the driver source voltage, the FET, diode, and inductor characteristics, etc.

Once the piezo has been charged to 60V, it may be quickly discharged back to the driver idle voltage (e.g., ~5V). This discharge may be performed by generating another PWM that drives a discharge FET/resistor. The resistor may provide a limit on the discharge rate (e.g., ~600 uS)—so for a maximum discharge rate, the PWM may not be desired and may just be run wide open (100% duty cycle). Slower discharge rates may then be achieved by adjusting the PWM duty cycle.

As with charging, the discharge cycle may also be run open loop, i.e. it is possible to discharge the piezo for a fixed number of cycles. However, it may be desirable to have a suitable number of cycles. Otherwise, there may be some residual voltage on the piezo, which could build up over repeated actuations and may interfere with accurate pressure sensing.

In one embodiment, it may be desirable to close the loop on the charge and/or discharge cycles. It may be desirable to have an additional circuit that can measure the voltage across the piezo. Due to the high voltages used to drive the piezo and the low voltage produced by the piezo when used as a sensor, it may be desirable to have multiple gain modes in the measurement circuit. Switching between the gain modes may be done to ensure voltage limits are not exceeded on sensitive components such as FET amplifier and/or ADC inputs. For example, during discharge it may be desirable to switch the measurement circuit from low gain mode to high gain mode. However, it may be undesirable to do this too early—as the high voltage may damage components in the measurement circuit. Therefore, it may be desirable to discharge first in low gain mode until a piezo voltage is reached that, when switched over to high gain mode, may still be within the operating range of the measurement circuit. It may then be possible to continue to discharge in high gain mode until the desired driver idle voltage is reached.

Depending on the characteristics of the FET, it may be possible that the lowest measureable voltage in low gain mode may still be higher than the highest measureable voltage in high gain mode. In this case, it may be desirable to run the discharge open-loop for several additional PWM cycles before switching to high gain mode.

However, one concern with closing the loop on the piezo discharge may be that the time constant of the measurement circuit may not be insignificant compared to the total piezo discharge time. Therefore, by the time the system senses that the piezo voltage is as desired, it may have already been discharged beyond that point.

Thus, it may be desirable to anticipate this and terminate the discharge cycle when the sensed voltage is somewhat above a desired target. For example, this voltage offset may be designed so there may be a slight residual voltage on the piezo left over. This would tend to avoid wasting power by turning on the driver diode during discharge. This offset may not accumulate over repeated actuations because the system may discharge to the substantially same voltage after each actuation. The residual voltage may slowly discharge to the driver idle voltage (e.g., via leakage in the measurement circuit and piezo). In one embodiment, the pressure sensing algorithm may be designed to allow the baseline to track downward as the piezo voltage drifts down.

In another embodiment, closed-loop discharge may be affected a long settling time of the mechanical system after a discharge. Thus, even after the system has stopped discharging, the piezo voltage may continue to change while the mechanical system (piezo, adhesive, glass, finger, etc.) settles to its final steady state condition. In one embodiment, the time constant of this mechanical system (30-50 ms) may be long compared to the total discharge time (<1 ms). Typically the piezo voltage may increase after discharge is stopped. If the system attempted to resume sensing piezo pressure soon after the end of the discharge cycle, the system may see the piezo voltage rising fast enough and far enough to indicate increasing finger pressure on the piezo.

Thus, it may be desirable that, after each haptics event (charge followed by discharge), the controller may enter a special haptics recovery mode. In this mode, pressure sensing may be suspended and the piezo voltage is discharged approximately every 10 ms until a specified settling time (35 ms) has expired. At the end of this settling time, it may be the case that the mechanical system is sufficiently settled and pressure sensing is resumed.

Piezo Pressure Sensing Embodiments

When using the piezo as a sensor, it may be possible to measure the voltage across the piezo—e.g., when it is not being driven as an actuator. If the piezo is not being deflected by any pressure from the user's finger, this voltage may tend to be the idle voltage generated by the piezo driver. This idle voltage may vary slowly due to component variations, temperature, etc. However, it may be possible to calibrate out these slow variations to detect faster variation due to piezo deflection caused by pressure from the user's finger. It may be possible to compare the current piezo voltage to the calibrated baseline voltage and "detect" a press when the difference exceeds a threshold. Therefore, to activate the virtual button, the user would press down slightly on the virtual button sensor.

This embodiment may be sensitive enough that only a light pressure on the virtual button is applied for detection. In one embodiment, the piezo driver may be activated to give the user haptics feedback—e.g., that the button has been pressed. This haptics feedback may consist of a gradual (approx. 10 ms) ramp up of the piezo voltage (e.g., to ~60V) from its starting point (e.g., of ~5V) plus the pressure-induced voltage. Once the piezo voltage reaches a desired level (e.g., 60V), it may be quickly discharged (e.g., in about 1-2 ms). It is this rapid discharge that creates the "click" feel (and sound) of a dome switch being depressed.

Once the discharge is done, it may be possible to resume using the piezo as a pressure sensor to determine when declining pressure from the user's finger indicates a "release" of the virtual button. In one embodiment, it may be desirable to use piezo pressure to detect button press—while using the capacitive sensors to detect release. This embodiment may provide feedback to the user that tends to be consistent with a mechanical dome switch. In this embodiment, it may be desirable to detect the release and trigger the haptics feedback before the user's finger has actually left the surface, otherwise the click will be heard but not felt. Therefore, the capacitance of the user's finger may be measured prior to initiating the press haptics feedback. After the press click event is done and the mechanical system has been allowed to settle, it may be possible to resume capacitance measurements. The system may keep track of the peak capacitance measurement measured (e.g., starting with the measurement taken just prior to the press haptics event) and detect button release when the finger capacitance falls to ⅞ths of the peak (e.g., relative to the baseline, no-touch capacitance). This may allow the system to have a sensitive release threshold while still compensating for wide variations in touch capacitance. In addition, using a lower threshold (e.g., ½ of the peak) may tend to reduce the probability of noise-induced, early release detection.

In one embodiment, the system may use capacitive guard sensors. When any of these guard sensors are being touched, the virtual button may be deactivated. This may tend to prevent a user—who is applying broad pressure in the virtual button area (while carrying or gripping the product)—from activating the virtual button. Therefore, only when the system sees one of the capacitive virtual button sensors being touching without any of the guards being touched does the system "prime" the piezo pressure sensor and begin looking for a press event. The sensor may stay "primed" as long as one of the virtual button sensors is touched without any guards being touched. The touch panel area near the virtual button sensor may be treated as a third "guard". Any touches in this area may tend to have the same effect as touching the guard sensors which may surround the virtual button sensors.

Piezo Pressure Baseline Measurement

In one embodiment, the piezo pressure baseline may be the minimum pressure measured while the pressure sensor is "primed". This may tend to ensure that if the user slides his finger onto the virtual button with a slight pressure, this will not be enough to activate the virtual button. The user would intentionally press down slightly on the virtual button with additional pressure before a button press will be recognized.

Proximity Detection

In some embodiments, there may be no surface features on the glass to indicate the position of the virtual button. In those embodiments, it may not be possible to locate the virtual button by feel alone. Therefore, to aid users in locating the virtual button by feel, a proximity detection haptics feedback may be implemented. When the user swipes into the virtual button thru one of the guards, a special piezo "rumble" may be activated as soon as the virtual button sensors are touched without any guard sensors. The rumble may comprise of a sequence of haptics clicks that have lower amplitude (<60V) and slower discharge edges than a normal click event. There may be one click per sample period, or approximately 100 clicks per second. The amplitude of the clicks may increase as the total virtual button sensor capacitance increases so the user feels a slight increase in amplitude as his finger becomes more solidly centered on the virtual button sensor. The rumble may stop after a fixed number of clicks or as soon as any guard touch is detected or the virtual button touch is removed. The number of clicks may be selected (e.g. 15 clicks or approximately 150 ms) as desired to provide useable proximity detection.

In addition, in some embodiments, it may be possible—when the virtual button sensors are touched directly without swiping thru one of the guards—to have the proximity detect rumble suppressed. If this is not done, when the user is performing a direct intentional press of the virtual button, the user may feel the proximity rumble prior to the press click which may tend to degrade the dome switch feedback.

If multiple guards are detected simultaneously, the proximity detect rumble (and priming of virtual button detection) may be suppressed until all touches are removed. This may tend to prevent the user from feeling any rumble when the user is gripping or carrying the device in the virtual button area.

Tap Detection

Even though the virtual button can be activated with a very light press, it may still be desirable to detect virtual button activations for very short taps which do not provide enough pressure to exceed the pressure threshold. In one embodiment, when one of the virtual sensors is touched without swiping thru any of the guards, the virtual button signal may be asserted; but no haptics feedback may be generated. If the touch is removed a short time later without the pressure sensor detecting a virtual button press above the pressure threshold (and if this removal is not followed within a few samples by a guard touch), then the touch may be considered to be a valid tap. The virtual button signal may be de-asserted, a single haptics click may be generated, and the system may interpret the tap as valid.

If the duration of the tap is too long (~400 ms), tap detection may be suppressed, no haptics click is generated, and the tap may be reported as invalid. This may be affected to deal with the case where the user rests his finger on the virtual button intending to press it but later changes his/her mind and removes his/her finger.

If a pressure-induced press is detected before the touch is removed, tap detection may be suppressed for the remainder of this touch and virtual button presses may be detected and reported as normal.

Piezo Driving Circuit Embodiments

Figure 6:
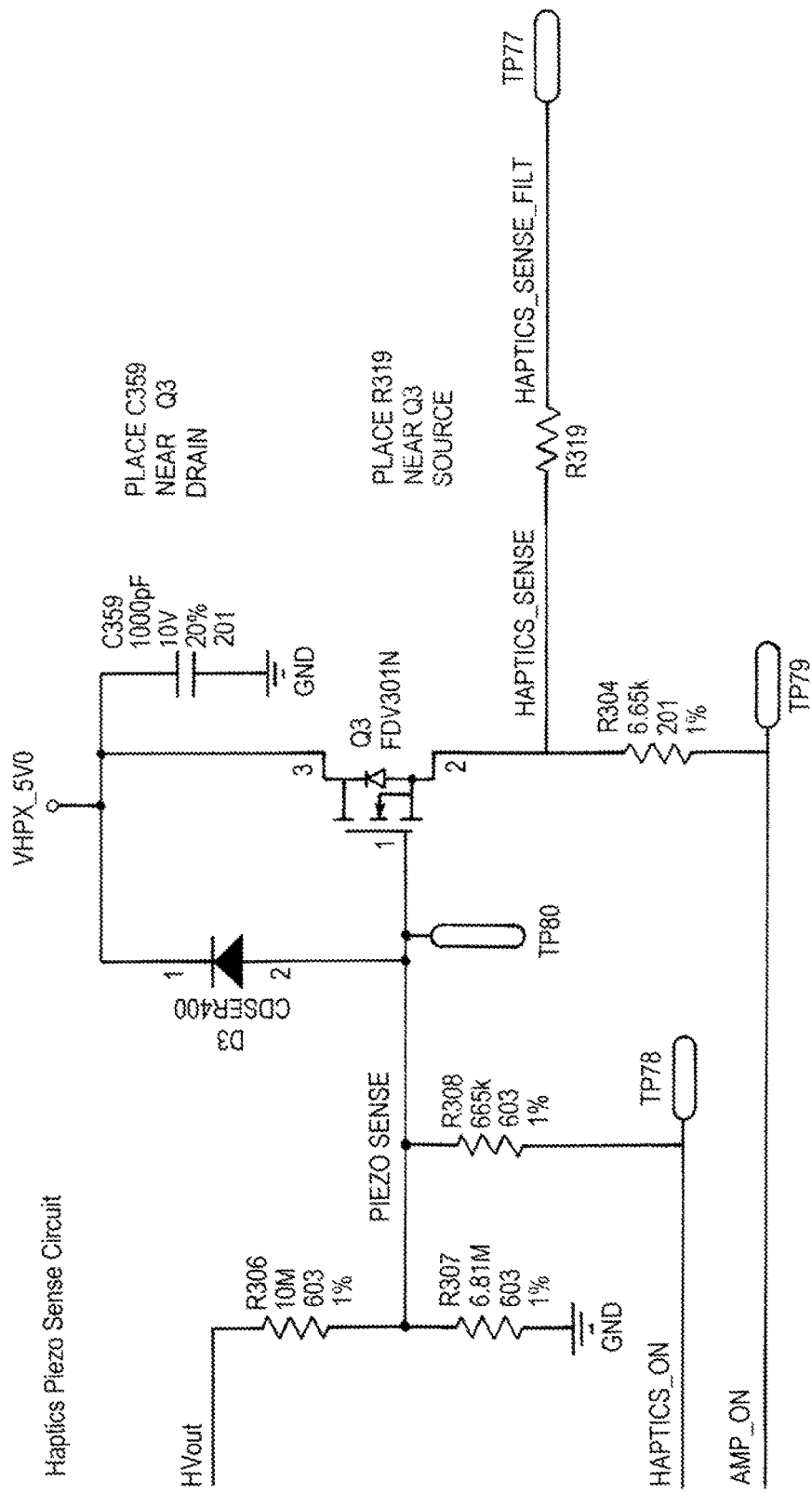
FIG. 6 is one embodiment of piezo sensing circuit.
Figure 7:
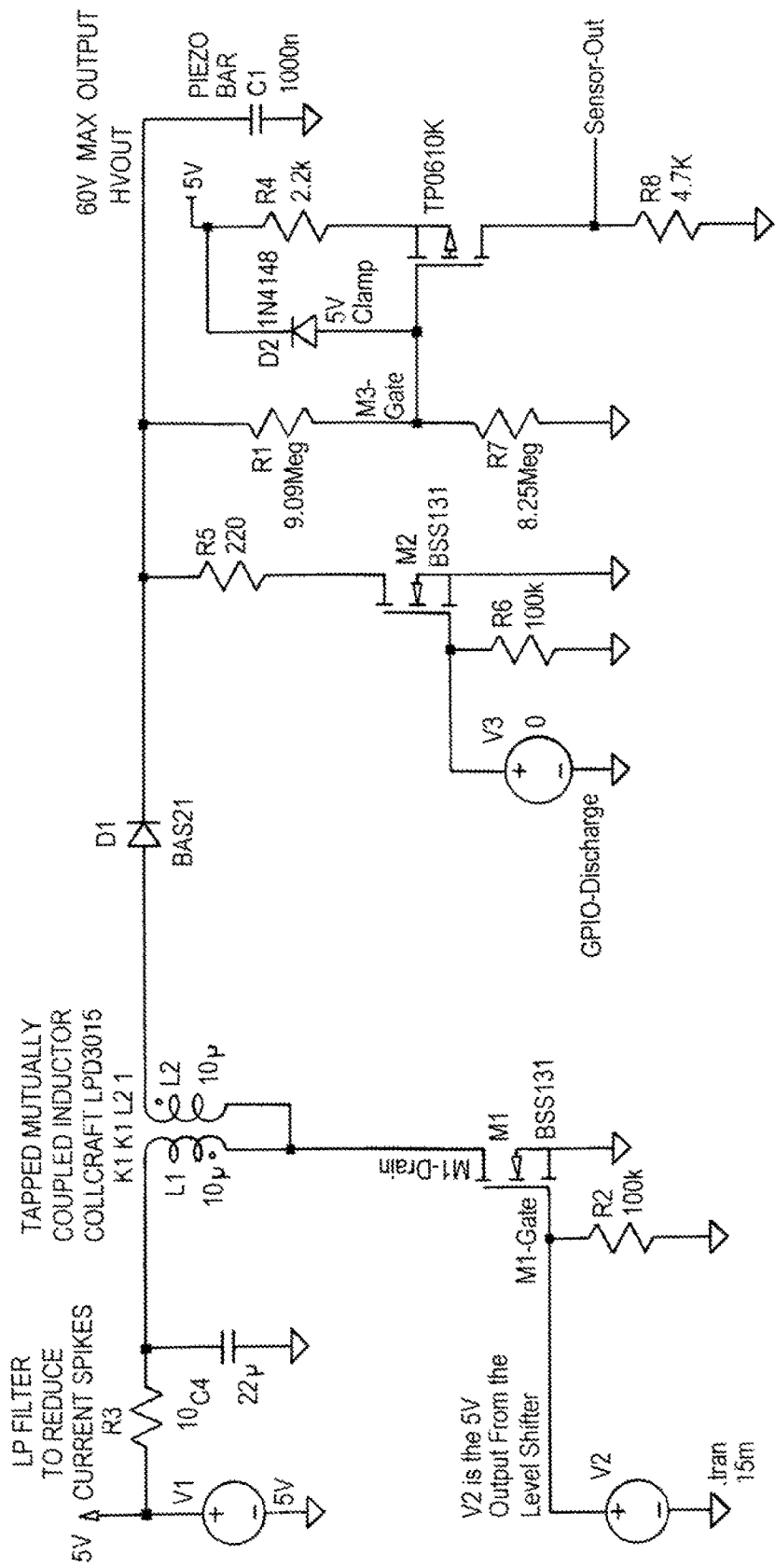
FIG. 7 is one embodiment of a piezo driving circuit.

FIG. 6 is one embodiment of a piezo sense circuit and FIG. 7 is one embodiment of a piezo driving circuit for a suitable piezo structure. As may be seen, V1 is a voltage source (e.g., a battery voltage). C4 stores charge, thus limiting the size of current spikes. Inductors L1/L2, diode D1, and FET M1 form the switching components. V2 represents a PWM output from the piezo controller for the charge cycle, possibly after going through a level shifter to bump the voltage up to a desired level (e.g., 5V) to turn the FET on harder. V3 represents a PWM output from the piezo controller for the discharge cycle. FET M2 performs the discharge. R1, R7, D2, PFET M3, R8 and R4 form the piezo sense circuit. Sensor-out connects to an ADC channel on the piezo controller. The P-FET M3 is turned on at low piezo voltages, and gets pinched-off at high voltages, so the output is inverted: as pressure is increased the voltage drops. It may be desirable to add a filter capacitor in series with R4, right at the ADC input. D2 conducts to protect M3 when the piezo is activated to high voltages.

Figure 8:
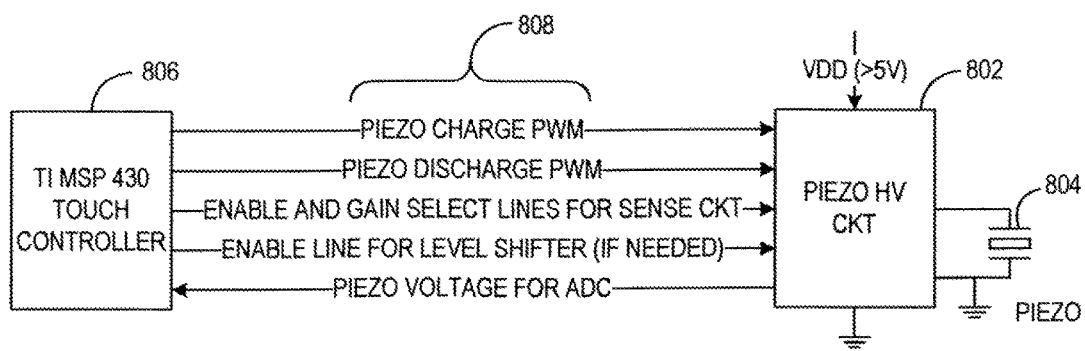
FIG. 8 is one embodiment of one embodiment of a piezo controller in communication with a piezo drive circuit and piezo element.

FIG. 8 is one embodiment of a piezo controller in communication with a piezo drive circuit and piezo element. As noted, piezo element 804 is in communication with piezo drive circuit 802. Drive circuit 802 is in further communications with piezo controller 806. Piezo controller 806 may supply drive and/or control signals (808) to piezo circuit 802—e.g., piezo charge PWM signal, piezo discharge PWM signal, enable and gain select line for sense circuit, enable line for level shifter (if needed). In addition, piezo drive circuit may send back the piezo voltage for ADC signal, as desired. In addition, piezo controller 806 may control the capsense system (if integrated with the piezo structures) of a virtual button.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A piezo-actuated structure, the piezo-actuated structure comprising:
    a deformable layer formed from a glass material;
    a piezo layer, the piezo layer mechanically mated to the deformable layer and capable of transmitting a haptic response to the deformable layer causing the glass material of the deformable layer to bend and simulate an actuated dome switch;
    an intermediate layer, the intermediate layer mechanically mated to the deformable layer and further the intermediate layer capable of providing mechanical communication between the deformable layer and said piezo layer; and
    a capacitive sensing layer, the capacitive sensing layer capable of triggering varying levels of haptic response transmitted by the piezo layer.

2. The piezo-actuated structure of claim 1 wherein the piezo layer comprises one of a group, the group being: piezoceramic material, PZT, electroactive polymers and electromechanical polymers.

3. The piezo-actuated structure of claim 1 wherein the glass material of the deformable layer comprises gorilla glass.

4. The piezo-actuated structure of claim 1 wherein the piezo layer is mechanically mated to the deformable layer by one of a group, the group being: adhesive, pusher structure, support structures and mounting structures.

5. The piezo-actuated structure of claim 1 wherein the piezo-actuated structure further comprises:
    support structures, the support structures mechanically mated to the piezo-actuated structure and further capable of supporting the piezo layer.

6. The piezo-actuated structure of claim 1 wherein the piezo-actuated structure further comprises:
    a pressure sensing device, the pressure sensing device being one of a group, the group being: the piezo layer, piezo-actuated button, piezo-actuated bender, piezo-actuated bar, capacitive sensing device, force sensitive resistors and piezo-resistive device.

7. The piezo-actuated structure of claim 1 wherein the piezo-actuated structure comprises a bimorph configuration and further at least a first piezo layer and a second piezo layer mechanically mated to each other, the first piezo layer on top of the second piezo layer.

8. The piezo-actuated structure of claim 1 wherein the piezo-actuated structure comprises a unimorph configuration and further a clamping structure, such that a first end of the piezo-actuated structure is clamped by the clamping structure and a second end of the piezo-actuated structure is capable of free movement.

9. The piezo-actuated structure of claim 1 wherein the deformable layer is capable of a first deflection range upon activation of piezo layer.

10. The piezo-actuated structure of claim 9 wherein the piezo layer is capable of being activated by a first electric waveform; and further the piezo layer is capable of deflecting a first deflection range upon activation of the first electric waveform.

11. The piezo-actuated structure of claim 10 wherein the first waveform comprises a first fast charging portion and a second slow discharging portion.

12. The piezo-actuated structure of claim 10 wherein the first waveform comprises a first slow charging portion and a second fast discharging portion.

13. A method for actuating a piezo-actuated structure, the piezo-actuated structure comprising:
    a piezo layer;
    a deformable layer formed from a glass material;
    an intermediate layer, the intermediate layer mechanically mated to the deformable layer and further the intermediate layer being capable of providing mechanical communication between the deformable layer and the piezo layer;
    a capacitive sensing layer, the capacitive sensing layer capable of triggering varying levels of haptic response transmitted by the piezo layer; and
    the piezo layer mechanically mated to the deformable layer, the method being:
        receiving a first pressure applied to the deformable layer and transmitted through the intermediate layer to the piezo layer;
        in response to the receiving of the first pressure applied to the deformable layer, sending a piezo actuating signal from an actuation circuit to the piezo layer; and
        communicating a mechanical signal to the deformable layer by movement of the piezo layer in response to the piezo actuating signal causing the glass material of the deformable layer to bend and simulate an actuated dome switch.

14. The method of claim 13 wherein receiving the first pressure further comprises receiving pressure from a finger pressing against the touch sensitive surface.

15. The method of claim 14 wherein the intermediate layer providing mechanical communication between the deformable layer and the piezo layer further comprises transmitting a mechanical deformation from the touch sensitive surface to a pressure sensing device, the pressure sensing device being one of a group, the group being: the piezo layer, piezo-actuated button, piezo-actuated bender, piezo-actuated bar, capacitive sensing device, force sensitive resistors and piezo-resistive device.

16. The method of claim 15 wherein sending a piezo actuating signal further comprises sending an actuating waveform to the piezo layer.

17. The method of claim 16 wherein sending an actuating waveform to the piezo layer further comprises sending a waveform having a first fast charging portion and a second slow discharging portion.

18. The method of claim 16 wherein sending an actuating waveform to the piezo layer further comprises sending a first slow charging portion and a second fast discharging portion.

19. A touch sensitive surface structure comprising:
    a touch sensitive surface, the touch sensitive surface further being a deformable layer formed from a glass material;
    a piezo layer, the piezo layer in mechanical communication with the deformable layer and capable of sensing pressure and transmitting a haptic response to the deformable layer causing the glass material of the deformable layer to bend and simulate an actuated dome switch;
    an intermediate layer, the intermediate layer mechanically mated to the deformable layer and further the intermediate layer capable of providing mechanical communication between the deformable layer and the piezo layer;
    a capacitive sensing layer, the capacitive sensing layer capable of triggering varying levels of haptic response transmitted by the piezo layer; and
    a piezo actuating circuit, the piezo actuating circuit in electrical communication with the piezo layer and further wherein the piezo actuating circuit is capable of sending a piezo actuating signal to the piezo layer in response to sensing a pressure applied by a finger.

20. The touch sensitive surface structure of claim 19 wherein the piezo actuating signal comprises a waveform having a first slow charging portion and a second fast discharging portion.

* * * * *